US008632737B2

(12) United States Patent
Burg et al.

(10) Patent No.: US 8,632,737 B2
(45) Date of Patent: Jan. 21, 2014

(54) SYSTEMS AND METHODS FOR CONTROLLED PERVAPORATION IN HORTICULTURAL CELLULAR TISSUE

(75) Inventors: Stanley P. Burg, Miami, FL (US); Richard D. Bothell, Port Townsend, WA (US); Jed C. Bothell, Port Townsend, WA (US)

(73) Assignee: Atlas Bimetals Labs, Inc., Port Townsend, WA (US)

( * ) Notice: Subject to any disclaimer, the term of this patent is extended or adjusted under 35 U.S.C. 154(b) by 799 days.

(21) Appl. No.: 12/760,776

(22) Filed: Apr. 15, 2010

(65) Prior Publication Data

US 2010/0267144 A1 Oct. 21, 2010

Related U.S. Application Data

(60) Provisional application No. 61/170,506, filed on Apr. 17, 2009.

(51) Int. Cl.
*A61B 10/00* (2006.01)

(52) U.S. Cl.
USPC ............... 422/536; 422/63; 422/64; 422/65; 422/66; 422/67

(58) Field of Classification Search
USPC .............................. 422/63–67, 536
See application file for complete search history.

(56) References Cited

U.S. PATENT DOCUMENTS

| | | | |
|---|---|---|---|
| 3,333,967 A | 8/1967 | Burg | |
| 3,810,508 A | 5/1974 | Burg | |
| 3,913,661 A | 10/1975 | Burg | |
| 3,958,028 A | 5/1976 | Burg | |
| RE28,995 E | 10/1976 | Burg | |
| 4,061,483 A | 12/1977 | Burg | |
| 4,331,693 A | 5/1982 | Wojciechowski | |
| 4,655,048 A | 4/1987 | Burg | |
| 4,685,305 A | 8/1987 | Burg | |
| 5,077,009 A | 12/1991 | Subotics et al. | |
| 5,564,225 A | 10/1996 | Quiding et al. | |
| 5,747,082 A | 5/1998 | Floyd et al. | |
| 6,766,612 B1 | 7/2004 | Liu | |
| 2002/0012728 A1 | 1/2002 | Carlson et al. | |
| 2006/0024195 A1 | 2/2006 | Lagunas-Solar | |

OTHER PUBLICATIONS

Bangerth, Changes in sensitivity for ethylene during storage of apple and banana fruits under hypobaric conditions, Scientia Horticulturae, vol. 24, Iss. 2 (1984) pp. 151-163.

Burg, Postharvest Physiology and Hypobaric Storage of Fresh Produce (2004) CABI Publishing, Cambridge MA, Chapters 1, 2, 9, 12, 13, 15.

(Continued)

*Primary Examiner* — Jyoti Nagpaul
(74) *Attorney, Agent, or Firm* — Virginia P. Shogren, Esq.

(57) ABSTRACT

A hypobaric apparatus and methods capable of inducing and maintaining in stored horticultural cellular tissue controlled pervaporation of undesired chemical compounds without reaching the boiling point of intracellular water molecules, comprising a hypobaric chamber constructed to provide a leak rate of less than 4.0 mm Hg per hour, sensors and regulators coupled to the chamber and to a controller to measure and regulate target correlates. Commodities processed, including processing storage periods longer than any known involving controlled atmosphere, exhibit an absence of low oxygen injury, high carbon dioxide injury, chilling injury, leaf abscission, leaf de-greening, fungal decay, bacterial decay, gravitational curving, geotropic curvatures, leaf epinasty, stem epinasty, flower fading, senescence, live invertebrates at any life stage, fumigant chemical compounds, volatile fungicides, volatile bactericides; no advance in ripening; minimal water loss.

9 Claims, 7 Drawing Sheets

(56) References Cited

OTHER PUBLICATIONS

Corey, et al., Toward Martian agriculture: responses of plantsto hypobaria, Life Support & Biosphere Science (2002) 8(2): 103-14 (Abstract only).

Davenport, et al., Optimal Low-pressure Conditions for Long-term Storage of Fresh Commodities etc., HortTechnology (Jan.-Mar. 2006) pp. 98-104.

Burg, Environmentally Friendly Technologies for Agricultural Produce Quality, S. Ben Yehoshua, ed. (2005) Ch. 4.

Burg, Fruit Storage at Subatmospheric Pressures, Science (Jul. 1966) vol. 153, No. 3733, pp. 314-315.

Burg, et al., Metabolism, heat transfer and water loss under hypobaric conditions, Post Harvest Physiology and Crop Preservation (1983) Plenum Press, NY pp. 399-424.

Burg, et al., The physiology of ethylene formation in applies. Proc. Natl. Acad. Sci. USA (1959) 45 (3), pp. 335-344.

Burg, et al., Summary of Hypobaric Research in China and the West, Journal of Refrigeration (Apr. 2007) vol. 28, No. 2.

Fei Tao, et al., Effects of different storage conditions on chemical and physical properties, etc., Journal of Food Engineering (2006) vol. 7, Issue 3, pp. 545-549 (Abstract).

Ilangantileke, et al., Post harvest biotechnology to increase storage ufe of mango (2006) Asian Institute of Technology, Bangkok Thailand.

Li Wen-Xiang, et al., Effects of combined hypobaric and atmosphere cold storage on the preservation of honey peach (2005) Institute of Agrophysics, 19.

Lougheed, et al., Low pressure storage for horticultural crops, HortScience (1978) vol. 13(1).

Lougheed, et al., LPS—Great expectations, Horticultural Report: Controlled Atmospheres, etc., (1977) pp. 38-44.

Palta, et al., On simultaneous transport of water and solute, etc., Physiologia Plantarum (1980) 50:83-90.

Paul, et al., Hypobaric biology: *Arabidopsis* Gene Expression, etc., Plant Physiology (2004) vol. 134(1): 215-223.

Peterson, et al., Leaf Temperature of Radish (*Raphanus sativus*), etc., Power Point (2004).

Spalding, Low pressure (hypobaric) storage of several fruits and vegetables, Proc. Fla. State Hort. Soc. (1979) 92:201-203.

Spalding, et al., Quality of sweet corn stored in controlled atmosphere, etcl., J. Amer. Soc. Hort. Sci. (1978) 103(5): 592-595.

Stenvers, et al., Ripening of tomato fruits at reduced atmospheric and partial oxygen pressures, Nature (1975) vol. 253, No. 5492, pp. 532-533.

Tolle, Hypobaric storage of mature-green tomatoes, USDA Agr. Research Rept. (1969) 842, pp. 1-9.

Tolle, Hypobaric storage of fresh produce, United Fresh Fruit & Veg. Assn., (Jul. 1972) pp. 27, 28, 30, 34, 36, 38, 43.

Wilkerson, et al., Design Considerations for a Greenhouse on Mars, etc., ASABE Technical Library (2004) Paper No. 044100, ASAE Annual Meeting (Abstract only).

Wu, et al., Effects of sub-atmospheric pressure storage on ripening, etc., Journal of Food Science (1972) vol. 37, pp. 952-956.

Xue, et al., Effects of hypobaric storage on physiological and biochemical changes, etc., Agricultural Sciences in China (Apr. 2003), 429-434 (abstract only).

SYSTEMS AND METHODS FOR CONTROLLED PERVAPORATION IN HORTICULTURAL CELLULAR TISSUE

CROSS REFERENCE TO RELATED APPLICATIONS

This application claims priority under 35 USC 119(e) of Provisional Patent Application Ser. No. 61/170,506 filed Apr. 17, 2009, entitled "Systems and Methods Relating to Fractional Distillation in Living Matter by Precise Vacuum Control", said application filed by the same inventors, incorporated herein by reference in its entirety.

FIELD OF THE INVENTION

The invention relates to increasing and improving the storage life and preservation time of biological matter, including fresh horticultural commodities, and more particularly to recent, novel improvements to hypobaric systems that make possible novel methods involving extremely precise, narrow range target conditions of ultra-low pressure, low temperature, near saturated humidity, and rarified air-change rates that unlike previous hypobaric systems, successfully and reliably preserve fresh commodities for a significantly extended period of time.

BACKGROUND OF THE INVENTION

The field of hypobaric research for extending the storage life and preservation of food and horticultural commodities has been controversial since its inception more than 40 years ago. Since then, scientists expert in the art of post-harvest physiology have advanced numerous claims both commending and condemning hypobaric storage, and peer-reviewers have approved research publications promulgating both sides of the controversy with mutually incompatible opposing views.

Hypobaric storage was first attempted by Burg in 1966, and the concept received the 1979 US Food Technology Industrial Achievement award for 'development of an outstanding food process or product that represents a significant advance in the application of food technology to food production'. However, shortly thereafter, and continuing to the present time, research publications from England, Holland, Canada, Japan, Israel, China, and the U.S. attributed numerous shortcomings to hypobaric low pressure storage technology ("LP Technology").

For decades, LP Technology has been severely criticized as having implicit deficiencies. Multiple shortcomings were found with respect to severe desiccation, excessive production of ethylene ($C_2H_4$), inability to remove ethylene from within tissue, excessive fungal growth/decay, failure to ripen or improper ripening, and loss of flavor and aroma.

First, it was found that LP storage severely desiccated horticultural commodities, even though humidifiers were used to provide moisture within the low pressure chambers. Tests funded by NASA in connection with the Mars Greenhouse Program, resulted in desiccation of seedlings present in hypobaric light growth chambers within hours at a high RH and pressures as low as 20 mm Hg. At 75 mm Hg the plants sensed water stress even though their roots were immersed in a water supply and the humidity in their surroundings was 95% or higher (Paul et al., 2004). During one day the differential expression of more than 200 genes was altered. Genes associated with desiccation showed increased expression in hypobaria (low pressure) and were unaffected or repressed by hypoxia (low oxygen), while both hypobaria and hypoxia induced genes associated with fermentative pathways. Paul et al. concluded that a plant's response to hypoxia was a specific adaptation to perceived desiccation overlaid upon an adaptation to hypoxia. Second, it was reported that LP Technology was incapable of lowering internal levels of active ethylene ($C_2H_4$) and that the process damaged commodities, causing them to produce "wound" $C_2H_4$. Third, it was stated that the low pressure system's requirement for a high relative humidity condition should promote fungal growth and resultant decay of the commodities while in storage. Fourth, while LP Technology was recognized as an alternative method of producing a low oxygen environment, it was concluded that the technology did not provide or replace the benefit that added carbon dioxide produces in controlled atmosphere storage systems, and instead LP removed carbon dioxide.

Fifth, and equally troubling, is the claim that low pressure conditions evacuate and out-gas flavor and aroma components from fruits, resulting in poor flavor and unsatisfactory ripening. This hypothesis was first advanced by Wu et al. (1972) based on a study with green tomatoes. Apples also failed to develop normal flavor and aroma when they were ripened after prolonged LP storage (Bangerth, 1984), but when the same behavior was noted after apples were kept in CA for a prolonged time, it was suggested that this effect must be caused by $O_2$ depletion rather than a low pressure. Bananas transferred to air after 4 months at 40-50 mm Hg (0.8 to 1% $O_2$), ripen with normal color, texture, sweetness, flavor, and aroma, but after only 11 days in CA at 1% $O_2$ they lose their ability to produce ethylene or develop acceptable flavor and sweetness. The same may be true of green tomatoes since the air change rate in Wu et als. LP apparatus was only 0.05 chamber volumes per hour, and therefore the fruits must have consumed nearly all of the supplied oxygen at the lower pressures tested.

Consequently, numerous barriers to effective LP Technology have been long-recognized and debated, and LP Technology has never been viewed as an improvement, let alone a substitute, for conventional controlled atmosphere storage systems. The holy grail of LP Technology is a system that achieves successful long-term physical storage in excess of what is possible using conventional controlled atmosphere systems, while also avoiding aesthetic damage to the flavor and aroma of the commodity. Such a system has evaded the food preservation industry for decades, and has been viewed as an impossibility based on many existing studies.

Water Loss

Perhaps the greatest hurdle to preserving the storage life of post-harvest commercial commodities is preventing water loss, and in that category, LP Technology has been a proven failure. Reports that LP Technology desiccated commodities so diminished interest in the process that by the early 1990's, hypobaric storage research essentially ceased in the western hemisphere. The excessive commodity weight loss caused by LP Technology (water loss/desiccation) has been confirmed as recently as 2008 by Chinese researchers.

According to the first law of thermodynamics, the quantity of water which can be evaporated from an adiabatic system depends on the amount of heat added. Water loss results in evaporative cooling, which lowers a stored commodity's temperature unless the latent energy used to change the state of water from liquid to vapor is replaced from a heat source. Accordingly, commodity water loss in a refrigerated room utilizes latent heat from respiration and fermentation, sometimes augmented or reduced by additional heat transferred by convection and/or radiation to or from the stored product from the environment. When the commodity remains at a constant temperature, if the heat needed to evaporate the transpired water is less than the respiratory and fermentative heat, the commodity must transfer heat to its environment, but if the heat used to transpire water exceeds the respiratory and fermentative heat, the commodity is acquiring heat from its environment. A commodity stored in a refrigerated space cannot remain at a constant temperature and loses more water than its respiratory heat is capable of vaporizing unless it is colder than its environment and receiving heat from it.

Researchers have examined why, in so many studies, LP Technology desiccated commodities. Commencing in 1978, it was suggested that leak rates may have an effect, and it was theorized that the leaks allow non-humidified air at atmospheric pressure to enter chambers, making it difficult to increase the humidity to the level required to prevent excessive commodity water loss.

However, the leakage hypothesis contradicted findings from numerous published studies. (Tolle, W. E. (1969) *Hypobaric Storage of Mature Green Tomatoes. USDA Agr. Research Rept.* 842, pp. 1-9; Tolle, W. E. (1972) *Hypobaric Storage of Fresh Produce.* 1972 Yearbook. United Fresh Fruit & Vegetable Association. pp. 27, 28, 30, 34, 36, 43.) Tolle attempted to prevent commodity water loss by automatically controlling the humidity responsive to a humidistat installed in the storage chamber. In Tolle's apparatus, strawberry weight loss increased at higher flow rates even though the electro-sensors recorded the same high humidity independent of air-flow. When tomatoes were stored in his apparatus without humidification, water droplets condensed as beads inside the lids of the storage chamber. In both instances, the stored commodity was saturating the rarified air. In addition, Lougheed et al, (1977) LPS—Great expectations. In: Dewey, D. H. (ed.) *Horticultural Report: Controlled Atmospheres for the Storage and Transport of Perishable Agricultural Commodities*, pp. 3-44, reported that apples rapidly desiccated even when a humidity sensor indicated that the humidity in the chamber was close to 100%. Modern Chinese hypobaric storage systems experience this same difficulty, and they also utilize a humidistat to control the chamber's relative humidity. These findings seemed to contradict the hypothesis that an excessive vacuum leak rate is a primary cause of desiccation during hypobaric storage.

This controversy was partially resolved by proprietary tests carried out in a prototype hypobaric intermodal container, in which a highly accurate bureau of standards mirrored dew-point sensor monitored and controlled the humidity. Whenever the relative humidity decreased below 95%, the sensor energized a water boiler's electric immersion heater causing low-pressure cold-steam to be injected into the rarified air-change before it entered the storage chamber. Without cargo present, the system worked as envisioned, but in the presence of a full commodity load the humidification heater failed to energize because the dew-point sensor could not distinguish whether the chamber moisture had originated from the commodity or the boiler. This test demonstrated that humidity could not be accurately controlled by a humidistat installed within a hypobaric storage chamber filled with commodity.

Leakage is not the only experimental error that can cause excessive commodity weight loss during hypobaric storage. A study comparing CA and LP storage of green peppers illustrates the error created by humidifying the air-change at atmospheric pressure before it enters an LP chamber (Hughes et al., 1981). Peppers kept in LP at various pressures became 'wrinkled and flaccid, showing severe desiccation', losing weight 4-5 times faster than those stored in CA. LP was judged to be the least effective method of storing green peppers, and it was concluded that 'water loss thus appears to be a major problem in hypobaric storage'. The humidified atmospheric air had expanded and decreased in RH as it entered the LP chamber. Storage at close to saturation in CA had been compared to flowing a 5-20% RH air-change in LP. The hypobaric method preserves green peppers without significant weight loss when the air-change is saturated at a low pressure rather than atmospheric pressure prior to entering the storage chamber. This same experimental mistake is evident in studies carried out at the National Vegetable Research Station in England, and by Wu et al. (1972) with potatoes, apricots, peaches, sweet cherries, apples, and tomatoes, and by Ilangantileke and Salokhe (2006) with mangoes.

Ethylene Buildup

Another claimed shortcoming of LP Technology is an inability to remove "active" ethylene ($C_2H_4$) from within commodities during storage. Ethylene is a natural plant hormone that shortens storage and shelf life by hastening fruit ripening and the senescence of flowers and vegetables. Horticultural products also produce this gas when they are subjected to stress or microbial infection during shipping, handling, or storage. Ethylene production poses one of the greatest threats (and associated costs) to horticultural harvesting, transport, and storage world-wide. Regardless of whether tomatoes were stored at atmospheric pressure (=20.9% $O_2$) or in pure $O_2$ at ⅕ atmosphere pressure (=20.9% $O_2$) they ripened at the same rate. Stenvers and Bruinsma (1975) concluded that 'Ethylene produced in ripening tissue may well exert its physiological effect during passage, within the cell, from the site of biosynthesis to the intercellular space, and reduction in the intercellular ethylene content by low atmospheric pressure is not effective in regulating senescence'. This experiment was carried out in a sealed LP system which accumulated at least 1-2 ppm ethylene prior to each daily chamber ventilation and re-evacuation. It was 'assumed' that 5 μl/l ethylene is required to stimulate ripening, but harvested tomatoes respond to one-thousandth that concentration, and 1 ppm is a supra-optimal dose. Daily ethylene accumulation had caused all of the tomato fruits to ripen at the same rate.

Carbon Dioxide Removal

Researchers also have claimed that LP Technology has no advantage over controlled atmosphere storage, and is in fact less effective than CA because LP cannot elevate $CO_2$ and instead lowers the gas's internal concentration within commodities by enhancing its diffusive escape (see FIG. 7).

Hypobaric System Shortcomings

Early hypobaric systems were designed to maintain a pressure range between 80 and 150 mm Hg in order to prevent low-oxygen injury to the commodity. At the low end of this range, 80 mm Hg, the oxygen levels were approximately 2%. (For purposes of this application, to simplify comparisons between atmospheric and sub-atmospheric pressure, gas and vapor concentrations are expressed as a percent gas or vapor; 2% oxygen thus refers to a partial pressure of 0.02 atmospheres). At oxygen levels lower than 2%, the end-products of fermentation, such as ethanol, acetaldehyde and ethyl-acetate, were expected to accumulate within the commodity and eventually reach toxic concentrations that cause off-flavors, necrotic and discolored tissues, off-odors and other symptoms of low-oxygen damage and spoilage. Thus, controls were added to the early hypobaric systems to prevent the development of vacuums lower than 80 mm Hg, thereby ensuring oxygen levels above 2% at all times.

Later, it was found that during hypobaric storage the tissues could withstand lower levels of oxygen if the air was humidified at close to 100%. Research was done with systems that brought pressures down to 10 mm Hg, and a corresponding 0.13% oxygen content at 0° C., and 15 mm Hg at 10° C. (0.1%

O2), and 20 mm Hg at 13° C. (0.24% O2) using humidifiers to keep the air saturated. Horticultural commodities were never tested at pressures lower than 10 to 15 mm Hg because researchers were aware that to avoid low oxygen damage when a totally anaerobic condition was approached would entail accurately and reliably supplying less than 0.1% oxygen, which was not possible to accomplish using available pressure controllers, measuring devices and temperature responsive dynamic pressure control.

Such devices were not required to store meat hypobarically since to accomplish this, the chamber only needed to be sealed to prevent air changes from entering, cooled to −1° C., and continuously evacuated. Meat does not suffer low oxygen damage when the vapor pressure of water in the meat is reached at 4.6 mm Hg. This prevents a further pressure decrease since the meat has begun to gently 'boil' at −1° C. At that time, the storage chamber's atmosphere is entirely composed of cold steam which is continuously being evacuated from the chamber and replaced by fresh cold steam evaporated from the meat. The cold-steam flushes away odors and any in-leaking oxygen, thereby maintaining the totally anaeroic condition required for maximum meat storage, while causing a tolerable weight loss during several months. Prior hypobaric storage patents accurately claimed 4.6 mm Hg at −1° C. as the preferred condition for meat storage, but they could not, and did not, verifiably claim this as a lower limit for horticultural commodities.

Unfortunately, while the problems of low oxygen injury were being diminished with combined low pressure between 10 and 20 mm Hg and the advanced humidifying systems, researchers found that the commodities often were still experiencing desiccation and other problems, rendering the systems not useful for extended storage purposes.

In the 1970's thru recent times, hypobaric systems were produced that could reduce internal pressures to below 10 mm Hg. However, leakage into these systems, including modern systems of today, was high—from under 10 mm Hg per hour to in excess of 30 mm Hg per. Researchers were aware that if the pressure was reduced to the vapor pressure of water at the storage temperature (see Table 1, infra), there would be no oxygen present in the storage chamber, and the commodity would be rapidly and irretrievably damaged by the anaerobic environment. By staying at or above 10 mm Hg at 0° C., and 20 mm Hg at 13° C., researchers were able to prevent the pressure from accidentally dipping low enough to cause low oxygen damage. However, even when assuring these low pressures, the research led to desiccated commodities.

Leak rates, lack of pressure control, lack of management of internal respiratory heat build-up, lack of chamber temperature uniformity, increases in internal ethylene, and problems with packaging have contributed to an inability to mechanically achieve the requisite correlated conditions to achieve vastly extended storage of fresh horticultural commodities. Furthermore, the danger of approaching certain conditions without proper control has served as a deterrent.

Accordingly, there is a decades-long un-met need in the art for hypobaric systems and methods that solve not just one or two, but all of the problems associated with LP Technology. The need is for systems and methods to extend storage and preservation for food and horticultural commodities that, among other benefits, simultaneously: 1) retain sufficient water within the cellular tissues; 2) prevent buildup of $C_2H_4$ and related harmful toxins in the tissues; 3) prevent fungal and bacterial growth; 4) retain flavor components and/or aroma molecules; 5) avoid low oxygen or high carbon dioxide damage and physiological disorders; 6) prevent geotropic and epinastic responses; 7) prevent ethylene responses such as ripening, senescence, de-greening and floral fading; and, 8) provide storage periods longer, and preferably significantly longer, than conventional controlled atmosphere storage systems

SUMMARY

The inventive Systems and Methods for Controlled Pervaporation in Horticultural Cellular Tissue of this application comprise an apparatus and methods capable of inducing and maintaining in stored cellular tissue long-term controlled pervaporation of undesired chemical compounds without reaching the boiling point of intracellular water molecules that would otherwise damage the tissue.

The apparatus comprises a processing chamber with a sealed opening, said chamber comprising an external wall and an internal wall defining, along with the sealed opening, an interior storage space having a volume. The chamber is constructed to provide a leak rate from said volume of less than 4.0 mm Hg per hour. Sensors coupled to the chamber measure pressure in the interior storage space. A pressure regulator regulates pressure within the interior storage space.

Storage contains a target pressure residing between a boiling point of water and a boiling point of one or more toxins at a target temperature. A controller is coupled to a user interface, the storage, the sensors, and the pressure regulator. The controller is programmed to perform operations comprising: via the user interface, receiving user input identifying one or more desired attributes for the processed cellular tissue; indexing the storage to identify one or more target correlates for the desired attributes, said correlates comprising a target pressure; and, according to feedback from the pressure sensor, directing the pressure regulator to maintain the target pressure inside the interior storage space.

Commodities are processed according to a method comprising: 1) placing the commodity within a processing chamber with a sealed opening, said chamber comprising an external wall and an internal wall defining, along with the sealed opening, an interior storage space having a volume; 2) maintaining a chamber leak rate of less than 4.0 mm Hg per hour; 3) receiving user input identifying one or more desired attributes for the processed cellular tissue; 4) indexing stored records to identify one or more target correlates for the desired attributes, said correlates comprising a target pressure residing between a boiling point of water and a boiling point of one or more toxins at a target temperature; 5) maintaining the target pressure inside the interior storage space; 6) maintaining a target temperature inside the interior storage space; 7) maintaining a target temperature of the internal wall; 8) maintaining a target humidity level inside the interior storage space; and, 9) maintaining a target air-change rate for the volume.

During processing, the correlated storage conditions prevent the production and retention of ethylene gas, accumulation of excessive carbon dioxide, ethanol, acetaldehyde and ethyl acetate, and induce the transfer all respiratory and fermentative heat by evaporating water and pervaporating ethanol, acetaldehyde and ethyl acetate. The correlated conditions also severely reduce the tissue's supply of usable biochemical energy by inhibiting respiration and fermentation, thereby preventing the tissue from underaking anabolic physiological processes such as ripening, leaf abscission, leaf-degreening, geotropic curvature, stem epinasty, flower fading, and senescence. Likewise, aerobic and microaerophylic molds and bacteria exposed to the preferred correlated conditions obtain so little usable biochemical energy that they cannot grow or reproduce. The resulting commodities following processing, including processing storage periods longer than any known involving controlled atmosphere, exhibit one or more desired attributes, including an absence of low oxygen injury, high carbon dioxide injury, chilling injury, leaf abscission, leaf de-greening, fungal decay, bacterial decay, geotropic curvatures, leaf epinasty, stem epinasty, flower fading, senescence, live invertebrates at any life stage; a minimal level of fumigant chemical compounds, volatile fungicides, volatile bactericides; no advance in ripening; minimal water loss; and/or retention of the ability to ripen in an at-harvest period of time either naturally or responsive to biologically produced or applied ethylene gas.

BRIEF DESCRIPTION OF THE DRAWINGS

The invention is described in more detail with reference to the attached drawings, in which.

DETAILED DESCRIPTION OF THE ILLUSTRATIVE EMBODIMENT

Figure 1:
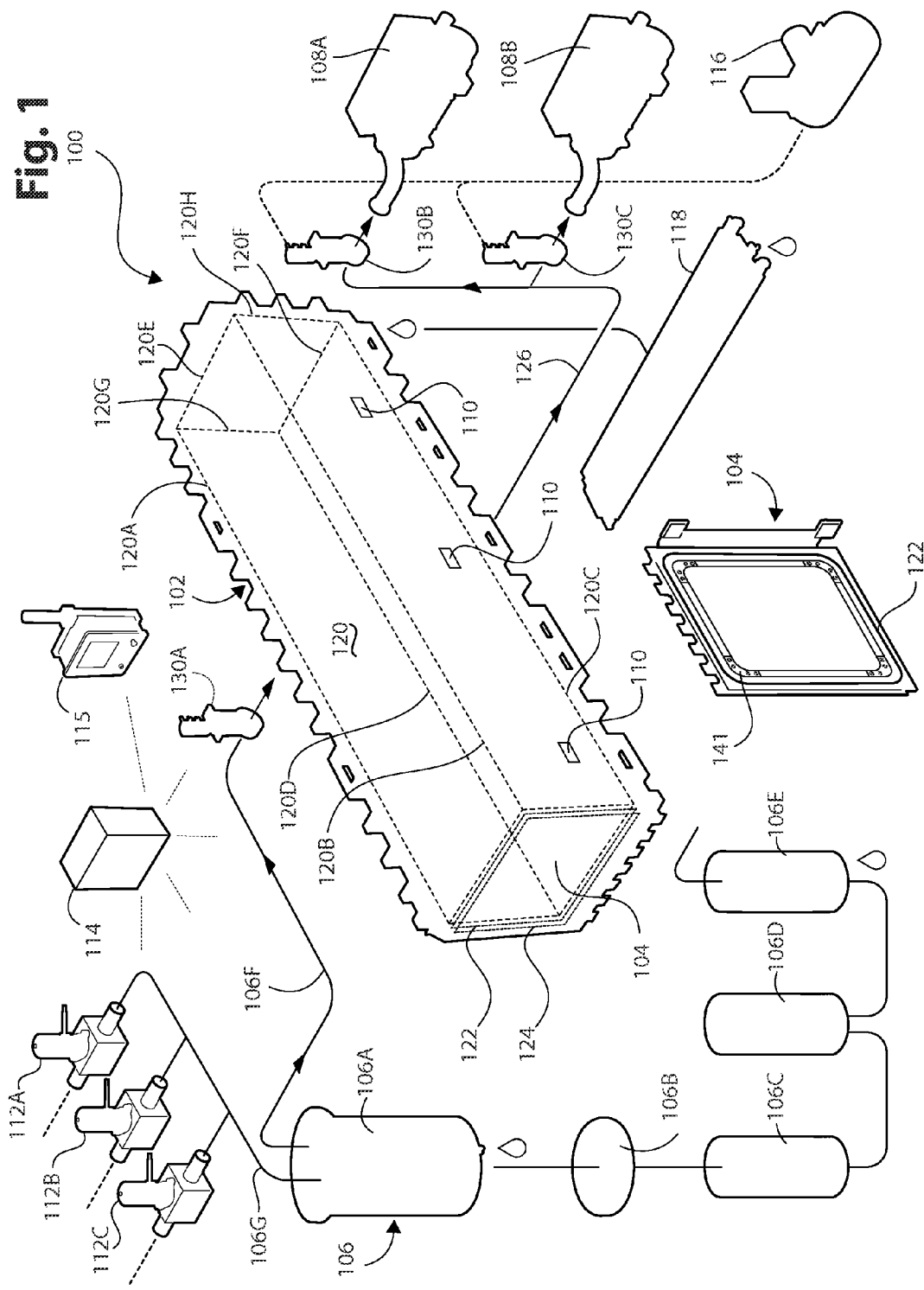
FIG. 1 is a perspective view schematic diagram of an exemplary warehouse hypobaric chamber system.

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing. Systems and Methods for Controlled Pervaporation in Horticultural Cellular Tissue In general terms, this invention pertains to systems and methods to create and maintain a narrow band of extremely low pressure and constant temperature to induce and maintain pervaporation in living cells to significantly extend storage periods for horticultural and other commodities.

The novel aspects of the hypobaric system and methods disclosed herein cause the by-products of fermentation, including ethyl acetate, ethanol and acetaldehyde, to pervaporate across the cellular membranes due to heat produced by respiration and fermentation during ultra-low pressure storage, while the boiling point of cellular water molecules is never reached.

The system and methods preserve fresh produce, flowers, plant cuttings, and any other desired horticultural commodity or living matter longer than any system or technique known. Significantly, the commodities, following extended storage periods, do not exhibit signs of low oxygen injury.

Moreover, the system is capable of preserving one type of life, such as plant matter, while simultaneously creating an environment that eradicates/kills another form of life, such as an insect, or rodent. In this manner, the system can be used to provide insect quarantine for the transport of fresh produce or other commodities across infested boundaries.

Other desired attributes of the system include the ability to store or transport mixed loads containing ethylene-producing and ethylene responsive commodities; an ability to vent and rapidly reinstate the required humidity, pressure, and flow so that the system can be used as an accessible warehouse or intermodal container from which a commodity may be distributed or drop-shipped; and, an ability to open, inspect and rapidly restart an intermodal hypobaric container as legally required to protect against drug and contraband importation.

A. Goal of Inducing Pervaporation without Reaching the "Flash Point" of Water

The inventors herein have discovered that the long sought-after key to successful hypobaric storage systems and methods is the ability to maintain the system in a specified, extremely narrow range of ultra-low pressure conditions at a nearly-saturated humidity, while maintaining a constant temperature, high enough to avoid cold damage while inducing pervaporation of harmful volatiles from within the cellular matter, on the one hand, while simultaneously preventing intracellular water molecules from reaching the "flash point" of boiling, on the other hand.

The process mimics pervaporation, a method used in commercial industry, recently under intensive development to remove water from ethanol biofuels. In commercial pervaporation, a synthetic, strong membrane separates a solution containing one or more volatile liquids, usually at atmospheric pressure, on one side, from solutions under a vacuum condition created on the other side. Heat is added, and as the liquid volatiles pass through the membrane at rates determined by their specific nature and the characteristics of the membrane. Then, the supplied heat vaporizes the permeating volatile liquid(s) at the outer surface of the membrane, and the vacuum draws the vapors away (vacuum pervaporation) or they are removed by forced flow (sweep-gas pervaporation).

Specifically, pervaporation is a three-step process: the sorption of permeate at the solution feed/membrane interface, diffusion across the membrane, and desorption into a vapor phase at the membrane's permeate side. The separation is based on the physical-chemical interactions between the membrane material and the permeating molecules. The first two steps are primarily responsible for the perm-selectivity. Because phase change occurs during the process, the membrane temperature and pressure gradient have significant effects on the separation performance. The permeate must be volatile under the operating conditions (i.e. below its vapor pressure), and an amount of energy needs to be supplied which is at least equal to the permeate's heat of vaporization. The process functions independent of vapor/liquid equilibrium. Separation of a dilute ethanol/water mixture by pervaporation typically is carried out through a hydrophobic membrane because ethanol permeates such membranes at a faster rate than water.

Figure 7:
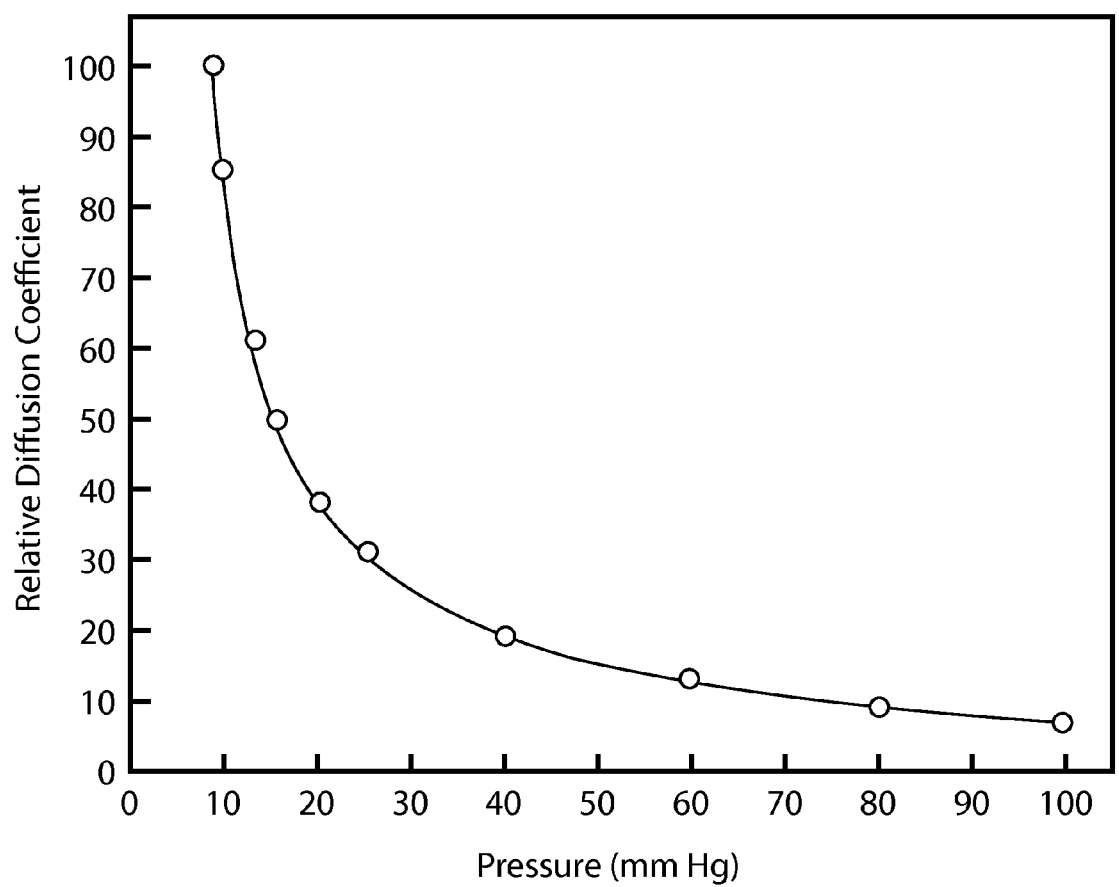

At atmospheric pressure and a physiological temperature, the fermentative end-products are unable to boil in a plant cell's cytoplasm and vacuole because of a high hydrostatic pressure, approximately 4 to 20 atmospheres, created by osmotic pressure and the opposing wall pressure. In a pure state, separated from water, the fermentative end product's boiling points at atmospheric pressure (table 1) are 78.4° C. (ethanol), 20.2° C. (acetaldehyde), and 77° C. (ethyl acetate). Therefore at atmospheric pressure and a physiological storage temperature pervaporation of these substances cannot occur. At atmospheric pressure, pervaporation also is prevented by the slow diffusion rate through the intercellular spaces of horticultural tissues (FIG. 7). A literature and patent review reveals that no publication has ever suggested that pervaporation might occur in a living plant cell.

LP storage provides living plant cells with the prerequisites required to pervaporate fermentative end-products from cytoplasmic fluid into the intercellular system. Small fat-soluble molecules, such as ethanol, acetaldehyde and ethyl acetate, rapidly diffuse through the hydrophobic lipid inner and outer surfaces of the plant cell's plasma membrane. Ethanol and water do not interact when they passively diffuse through the plasma membrane (Palta and Stadelmann, 1980), and many studies have shown that water molecules also pass through this membrane by facilitated transport through proteinaceous aquapores which cannot transport ethanol, acetaldehyde, or ethyl acetate. In a dilute aqueous solution the volatile fermentative end-products and water boil at the same temperature/pressure combination, but at the correlated pressure/temperature combination claimed herein for ultra-low-pressure hypobaric storage, when water and the fermentative end products reach the plasma membrane's outer surface independent of each other, they boil at the temperature and pressure combination indicated for the pure substances in Table 1. Fermentation produces 25.8 Kcal of heat per mol of ethanol whereas only 18.8 Kcal of latent heat is utilized vaporizing one mol of ethanol. The remaining 7 Kcal of heat produced by fermentation per mol ethanol, plus all heat produced by aerobic respiration, is used to evaporate water by means other than pervaporation (Table 1). At higher pressures other factors predominate.

The driving force for the mass transfer of permeants from the plasma membrane's feed to the permeate side is not a substance's volatility; rather, it is the volatile organic compound's chemical potential or partial pressure gradient across the plasma membrane. Raising the feed pressure increases the chemical potential gradient and flux through a pervaporation membrane, ten-fold for a feed pressure elevation from 1 atmosphere to 10 atmospheres. The permeation rate of a feed component also is increased by decreasing the pressure on the 'permeate' side of the pervaporation membrane. During ULP storage a plant cell's high hydrostatic pressure and the ultra-low pressure in its intercellular system combine to markedly increase the molar flux of fermentative end-products from the cytoplasm through the hydrophobic plasma membrane into the intercellular system. There the high diffusion rate caused by an ultra low pressure enormously accelerates the diffusive escape of these gases and vapors from the tissue. In addition, the continuous production of $CO_2$ gas and vapors of ethanol, acetaldehyde and ethyl acetate within the tissue increases the intercelullar pressure, creating an outward forced flow of these substances into the storage chamber. At equilibrium the fermentative end-products are escaping as rapidly as they are being produced, passing at the same rate from the cytoplasm to the intercellular system, from there into the storage atmosphere, and finally to the vacuum pump. Each cellular liquid phase equilibrates with an associated gas phase in accord with Henry's law, and therefore when pervaporation, rapid diffusion and forced flow accelerate the outward movement of these substances, their concentration decreases in all cellular air and liquid air phases.

Consequently, in the case of plant cells under hypobaric conditions, just as in the case of commercial pervaporation, the cell membranes separate pressurized cytoplasm from a vacuum condition outside the cell membrane. The pressure differentiation across the cell membrane causes fermentation by-products ("toxins" or "volatiles") to cross the cell membrane, be vaporized at the membranes' outer surface before exiting from it, drawn away by the vacuum forces (vacuum pervaporation) and rapid diffusion and forced flow at a low pressure (sweep-gas pervaporation). Pressure/temperature combinations which do not induce pervaporation of specific volatiles have little or no effect on their accumulation or loss. For example, ethanol accumulated in 'lobelle' sweet corn kernals at the same rate during LP storage at 50 mm Hg (1.4% $O_2$) and in CA at 2% $O_2$ (Spaulding et al., 1978). This experiment was complicated by the fact that corn kernels are a caryopsis bearing a single seed fused to the inner surface of a heavily waxed grain coat. Because the kernals lack air-filled stomates, lenticles or a pedicel end-scar, and LP only influences gas and vapor diffusion through an air phase, it could not increase the rate at which ethanol vapor escaped from these kernals. Storage at 40 to 80 mm Hg and 20° C. had no significant effect on the loss of EDB fumigant from citrus fruits, and pressures between 75 and 225 mm Hg did not significantly alter ethanol and acetaldehyde accumulation in Dong Jujube fruits (Zue et al., 2003).

If the pressure is decreased to the vapor pressure of the commodity's water, referred to as the "flash point", water is rapidly drawn through the cell membrane, vaporized, and be drawn away from the cell, rapidly cooling and eventually desiccating the tissue. The flash point varies depending on the commodity's temperature and the level of pressure. At the flash point, water released from the commodity displaces essentially all oxygen-containing air from the chamber. This can be identified in the vacuum pump exhaust by the presence of excess carbon dioxide and by a lack of oxygen. During commercial vacuum cooling of 65° F. roses, no measureable evaporative cooling occurs during an initial 30 minute evacuation period even though air expansion causes the chamber to become extremely dry, but when the pressure finally reaches 21 mm Hg, which is water's flash point at 65° F., commodity cooling begins at a rate of 28° F. per hour and the chamber's dew-point rises and closely tracks the commodity's declining temperature. This example illustrates the enormously different capacities of boiling and evaporation to vaporize volatiles.

Consequently, the key to successful hypobaric systems is inducing pervaporation of the toxic, volatile compounds without inducing pervaporation or boiling of intracellular water. The goal is to remove the harmful substances as they are produced, without desiccating the commodities. It is important to note that; (a) during LP storage heat transfer is dominated by evapo-transpiration and radiation since convection is ineffective at a low pressure, (b) excess water loss can only be prevented if the commodity is prevented from receiving environmental energy, and (c) this can be accomplished either by keeping the commodity warmer then the environment, or shielding it from radiation. A relatively small temperature gradient between a warmer chamber wall and cooler commodity can radiate enough heat to evaporate a significant amount of commodity water since the intensity of radiation depends on the fourth power of the temperature difference ($T_A^4 - T_B^4$) between the emitting (A) and receiving (B) surfaces. At 75 mm Hg and 70-78% RH, evapo-transpiration from lettuce seedlings was so rapid in a laboratory hypobaric growth chamber that it reduced the leaf temperature by 4-6° C., whereas at atmospheric pressure the leaf temperature was the same as the air temperature (Wilkerson et al., 2004). A hypobaric pressure also lowered the leaf temperature of radish seedlings (Peterson and Fowler, 2004), and at 10 mm Hg, 85% RH, it reduced the temperature of cut-rose flowers by 1.2° C. inside a hypobaric intermodal container. During a 55 day storage test with 30,000 lbs. of lamb carcasses in a prototype hypobaric intermodal container operated at −1° C., 4.6 mm Hg, and 95% RH, because the heavily insulated container door lacked the integral cooling coils present on the rest of the container shell, the temperature at the door's inner surface was +0.5° C. Line of sight radiation from the door to the adjacent row of hanging lamb carcasses across the 1.5° C. temperature gradient completely desiccated the adjacent row of meat without affecting the rest of the load.

Based on this discovery, applicants herein have established specific, narrow ranges of extreme low pressures in combination with correlated specified temperatures, whereby the by-products of fermentation pervaporate from the cellular matter separately and apart from water. Applicants believe that the selective pervaporation takes place because the volatiles have a lower boiling point than water. If the volatiles were passing through the cell membrane along with water, the flash point would be the same as for water. Since the novel systems and methods disclosed herein result in volatiles being removed without desiccation, it appears the volatiles, alone, are crossing the cellular membrane and pervaporating, leaving the water, which boils at a higher temperature, within the cells.

A window of optimum storage opens within this newly discovered range of correlated conditions. The conditions can only be achieved with proper mechanical control. In this correlated range, pervaporation suddenly occurs below the vapor pressure of ethanol removing the byproducts of fermentation at a hugely increased rate. In addition, diffusion rates in these ranges increase at very steep logarithmic clip which is beneficial but also poses extraordinary danger due to the potential for rapid desiccation. Lastly, since the oxygen levels are so low, pressure must precisely and dynamically be controlled to avoid anaerobic conditions. The innovations in this patent make possible the attainment of this narrow band of correlated conditions and the optimum resultant storage.

In summary, the key to successful long-term hypobaric storage is: 1) identifying a narrow band of pressure and specific temperature for particular commodities (each commodity having a particular cellular structure) that induces pervaporation of undesirable volatiles without reaching (at any moment) the "flash point" of boiling water; and, 2) providing a hypobaric system that is capable of selectively maintaining the narrow band of pressure and constant temperature over time.

At higher pressures other processes predominate. Progressively reducing the pressure below 250 mm Hg inhibits aerobic respiration and the associated production of heat, biochemical energy and carbon dioxide, while simultaneously increasing oxygen consumption and decreasing ethylene production. Lowering the pressure also causes the chamber leak rate and diffusion of gases and vapors to increase logarithmically (FIG. 7), while progressively inhibiting convective cooling, and enhancing the coefficient of condensation on surfaces and in cardboard microcapillaries. Below approximately 50-80 mm Hg, fermentation begins to accelerate, the storage chamber's humidity declines logarithmically depending on the magnitude of uncontrolled leakage, and radiation shields and polyethylene box liners may sometimes be advantageously employed to reduce weight loss. Below 40-80 mm Hg, water vapor accounts for a significant portion of the total gas/vapor mixture in the storage chamber and a log mean partial pressure correction begins to increase the water vapor flux through air-filled stomates, lenticles and the pedicle end scar. At 10 mm Hg and 0° C., the 0.46 mole fraction of water vapor in the saturated air/water vapor storage mixture increases the diffusion coefficient by 12%, and at still lower pressures, this effect rapidly increases in magnitude. Below 40 to 80 mm Hg, the growth of aerobic and microaerophilic bacteria and fungi progressively decreases and eventually ceases as the lowest tolerable storage pressure is approached. During papaya storage at 10° C. (FIG. 6) a significant upswing in fermentative $CO_2$ production occurs at approximately 10.5 mm Hg, slightly above the 9.2 mm Hg vapor pressure of water that signals total anaerobiosis. In the papaya example, low oxygen damage sets in at or slightly above 10 mm Hg (0.02% $O_2$) and at the correlated 10° C. storage temperature ethanol is pervaporated at and below 23.4 mm Hg.

No researcher expert in the art of postharvest physiology could have foreseen that a papaya, which rapidly suffers low oxygen damage when it is exposed to less than 1.5% oxygen at atmospheric pressure, could best be stored for an extended period of time in a hypobaric chamber containing close to 0.02% oxygen. Hypobaric storage is not simply another way to lower the oxygen concentration, lacking the benefit that adding $CO_2$ provides to CA, as so many researchers continue to insist. Instead, it is a highly complex process encompassing biochemical, physiological, physical, thermodynamic and mechanical advantages and potential problems associated with specific pressure ranges. The discovery that fresh plant produce benefits from a pressure range far lower than previously tested or thought to be tolerable without causing low oxygen damage opens a window of opportunity for improved long term preservation and storage of horticultural commodities.

B. System Components to Create and Maintain Controlled Pervaporation

FIG. 1 shows a schematic drawing of a warehouse embodiment for a hypobaric system of the present invention 100, comprising a stationary, rectangular box-shaped hypobaric chamber 102 with hinged door 104 placed within another storage structure, such as a warehouse (not shown). External to the chamber 102 is a humidifier assembly 106, pumps 108A, 108B, sensors 110, pressure regulators 112A, 112B, 112C, a controller 114, a user interface 115, a compressor 116, and a sump tank 118, isolation valves 130A 130B 130C. The chamber 102 and door 104, when closed as shown in FIG. 1, define an interior space 120 having a volume.

Referring to FIG. 1, the humidifier assembly 106 comprises a boiler 106A, a heater, 106B, a holding tank 106C, a water processor 106D, a water source 106E, and a conduit 106F coupling the boiler 106A and pressure regulator 112A to the chamber 102. Water enters the assembly 106 from water source 106E. The water is purified via reverse osmosis and further undergoes deionization 106D before being stored in a holding tank 106C. The water is then vaporized via a heater 106B coupled to the boiler 106A prior to entry into the chamber 102 via a pipe conduit 106F.

Novel hypobaric chamber system components are required to create and maintain controlled pervaporation. Said components and systems comprise: 1) a chamber 102 having a minute leak rate no greater than 4.0 mm Hg per hour; 2) pressure regulators 112A, 112B 112C capable of maintaining the pressure within a specified ultra-low range of pressure; 3) means for maintaining thermal uniformity of the chamber space 120 and chamber walls within specified temperatures; 4) means for maintaining humidity inside the chamber 120 at near saturation; 5) a computer controller 114 coupled to the user interface 115, sensors 110 and regulators 112A-C; and, 6) low cost means of retaining an elastomeric seal to the door 104

1) Chamber Leak Rate of Less than 4.0 Mm Hg Per Hour and Air-Change Rate Between 0.3 and 10 Volumes Per Hour.

There is no obvious indication that leakage is occurring from the chamber of a conventional hypobaric system, because the pressure regulating system automatically throttles the controlled air-change rate or increases the pumping speed to off-set uncontrolled leakage and prevent the pressure from changing. As a result, prior to 2003-2004, hypobaric chamber leak rates were not measured, and unbeknownst to researchers, the leak rates were often excessive. Researchers underestimated the magnitude of the chamber leakage problem by not realizing that in-leaking air expands when it enters a vacuum chamber, increasing in volume and decreasing in relative humidity proportional to the atmospheric/storage-pressure ratio.

At a low storage pressure, leakage supplies a greater part of the air-change passing through a hypobaric chamber, and the in-leaking expanded air is drier. The in-leaking air is nearly bone-dry at a 10 to 25 mm Hg storage pressure and may constitute a major portion of the air-change. Desiccation caused by chamber leakage is discernable in published LP studies whenever weight loss decreases as the pressure is lowered to 50-80 mm Hg, and then abruptly the commodity desiccates at lower pressures. A progressive inhibition of aerobic respiration as the pressure is lowered, which reduces weight loss because a supply of latent energy from respiration is needed to evaporate water. Below 80-100 mm Hg, an exponential decrease in a leaky vacuum chamber's RH and increase in water vapor's diffusion coefficient enables water to evaporate ever more quickly (FIG. 7; Corey et al., 2002).

The commodity's temperature is decreased by the resultant evaporative cooling, causing the environment to transfer latent heat to the commodity, which in turn is used to evaporate ever more commodity water. Weight loss from avocados decreased as the storage pressure was lowered to 80 mm Hg but increased below that value, whereas in another study, 90-100% of avocados stored at 20 mm Hg ripened normally with an insignificant weight loss, and only 30-50% of fruits stored at 76 or 760 mm Hg were acceptable. Mangoes ripened progressively more slowly and lost less weight as the pressure was lowered, but desiccated below 50 mm Hg, whereas in another study mangoes were stored for 60 days at 15 mm Hg in leak-free hypobaric chambers, without significant weight loss, growth of decay orgasms, or any advance in ripening. Excessive weight loss (water loss/desiccation) caused by chamber leakage can be discerned from many published hypobaric chamber studies.

FIG. 7 graphs the effect of pressure on the diffusion coefficient of during low pressure storage. This applies to the removal of all vapors including water. It also shows the importance of having a minimal leak rate in order to reduce commodity water loss at pressures lower than 50-80 mm Hg. Referring to FIG. 7, pressure is plotted on the x-axis and the relative diffusion coefficient is plotted on the y-axis. At a pressure of 10 mm Hg, the relative diffusion coefficient is 100. As the pressure increases past 10 mm Hg, the relative diffusion coefficient falls logarithmically. As evidenced by FIG. 7, the byproducts of pervaporation are removed at a logarithmically increasing rate as the vapor pressure of water is approached. Likewise leaking air expands logarithmically as pressure is reduced; as such, the leaking air displaces water vapor in the storage atmosphere reducing the relative humidity accordingly.

Unlike prior art, the system of this application requires that leak rates be strictly controlled to less than 4.0 mm Hg per hour. At these correlated ultra low pressures, the desiccation rate occurs at an extremely steep part of the logarithmic diffusion coefficient curve. For example, when operating at a pressure of 6 mm Hg, the diffusion coefficient of water is 117 times faster than at atmospheric pressure. In contrast, when operating at 50 mm Hg, the diffusion coefficient of water is 15 times faster than at atmospheric pressure. The difference between ULP and operating at 50 mmHg represents nearly an order of magnitude greater diffusion rate and desiccation rate.

Similarly, at the ultra low pressures disclosed in this application, leaking dry air expands on the same logarithmic curve as the diffusion rate, displacing water vapor proportionally. Consequently, the relative humidity is reduced to nearly bone dry conditions by a 117×air expansion at 6 mm Hg V.S. 15×air expansion at 50 mm Hg. Prior art did not both attempt to operate at these ultra low pressures and appreciate the importance of leaks in displacing the relative humidity inside the chamber.

To achieve a leak rate of less than 4.0 mm Hg per hour, the chamber 102 comprises: 1) continuous walls with a minimum amount of high quality welded seams; and, 2) specialized door seals. The system of this application 100 requires a chamber 102 ventilated by between 0.3 and 10 air changes per hour. This is necessary for successful long-term low-pressure storage for the following, non-exclusive reasons: (1) the amount of oxygen supplied to the chamber 102 is directly proportional to the air-change rate; (2) the extent to which respiration draws-down the supplied oxygen is inversely related to the air change rate and directly proportional to the commodity's storage density and oxygen consumption rate; (3) the intercellular concentrations of $CO_2$, $C_2H_4$, NO, HCN, ethanol, acetaldehyde, and ethyl acetate which accumulate are inversely related to the air change rate, since at equilibrium, the air-change removes these metabolic gases and vapors as rapidly as they are produced.

a) Continuous Wall Panels

Referring to FIG. 1, in the warehouse embodiment 100, the chamber 102 is constructed from ⅜ inch thick continuous steel panels forming a rectangular-shaped enclosure 120 with well seams restricted to the edge margins 120A-120F. The welds 120A-120F should exhibit deep penetration with no visible evidence of porosity (bubbles) and no oxidation. As shown in FIG. 1, the chamber 102 comprises four large steel panels each 40 feet by 10 feet welded at the edge margins 120A, 120B, 120C and 120D, and a steel panel of approximately 10 feet by 10 feet closing a back wall with edge margins 120E, 120F, 120G, 120H.

b) Chamber Door

FIG. 1 shows a door 104 of the exemplary warehouse system 100 in a closed, sealed position. Referring to FIG. 1, in the warehouse embodiment, the door 104 comprises a generally square-shaped 1 inch thick continuous sheet of aluminum. The door 104 further comprises a single O-ring gasket 122 affixed to the door 104.

Alternately, the door 104 comprises an O-ring assembly 141. The assembly 141 comprises a series of concentric O-rings 116 sealing the door 104. The assembly 141 is self supporting. Where multiple spaced O-ring gaskets 116 are used, the O-rings define spaces which may be plumbed directly into the vacuum pump 108A/B to minimize leakage.

FIG. 1 shows a door 104 with a self supporting O-ring apparatus 141 comprising a series of spaced inner clips 141 and outer clips (not shown) bolted (or otherwise attached) to the door 104. The clips 141 retain an elastomeric seal in position, thereby eliminating the expense of machining grooves into the door 104 or door flange 124 to retain the seal. The self supporting O-ring apparatus 141 is affixed to either the door flange 124 or the chamber 102 by any desired or suitable means, including magnets, holes, taped holes, and welded tabs. Any suitable or desired materials may be utilized for the gaskets 116 and/or O-ring support 141, including without limitation, extruded or shaped neoprene or elastomeric seals; metal, metal alloy, plastic or composite clips.

2) Pressure Regulator

Cellular tissue requires a small amount of oxygen to stay metabolically active. The tissue dies at pressures near the vapor pressure of water because oxygen levels at that pressure approach zero. The cellular tissue structure of various commodities differ. Consequently, the minimum threshold of oxygen concentration varies among commodities and cannot be stated concretely but is slightly above the vapor pressure of water at the minimum storage temperature which does not cause chilling damage. This makes the effective range of pressure even smaller than between vapor pressure of water and the vapor pressure of ethanol and highlights the need for precision control. Table 1, infra.

Figure 2:
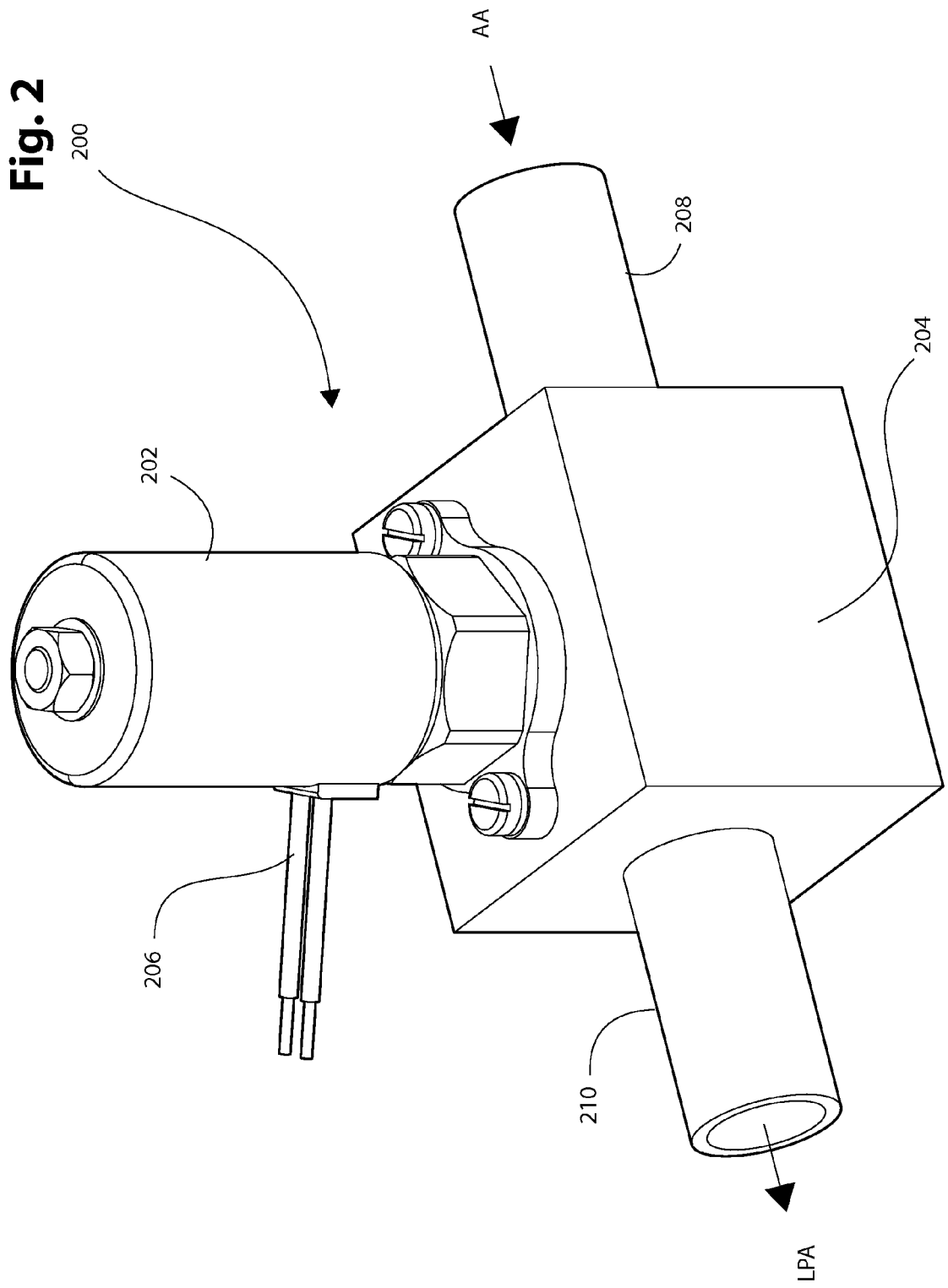
FIG. 2 is a perspective view diagram of an exemplary pressure regulator for a hypobaric chamber system.

FIG. 2 shows an exemplary pressure regulator 200, according to the invention. FIG. 2 corresponds to part 112A shown in FIG. 1. The methods disclosed herein require extremely narrow bands of pressure ranges, i.e., between 4.6 and 11.8 mm Hg at 0° C., and between 17.5 and 43 mm Hg at 20° C. The target pressure resides between 4.6 and 43 mm Hg for each of the one or more toxins at a target temperature residing between 0 and 20 degrees Celsius. The novel pressure regulator 200, in conjunction with the vacuum pumps 108A/B (shown in FIG. 1) has to maintain pressure within this extremely limited range. Too low of a pressure will deprive the commodity of oxygen and kill it; too high of a pressure will not vaporize the toxic byproducts of fermentation by pervaporation.

Referring to FIG. 2, the pressure regulator 200 comprises a computer-controlled solenoid valve 202. The valve 202 is coupled to a valve chamber 204, electronic controls 206, an intake aperture 208, and an exit aperture 210. The pressure regulator 200 may comprise additional solenoid valves 202 in case of power loss or as back up to a malfunctioning valve 202.

Referring to FIG. 2, the solenoid valve 202 comprises an internal orifice (not shown) that can be opened or closed via computer controlled activation. The solenoid valve 202 is capable of receiving pulse-width modulation (PWM) signals (current). The PWM signals control minute valve movements depending on the length of the signal or current pulses. Referring to FIG. 2, the internal valve opening (not shown) permits entry of atmospheric air labeled "AA". In operation, low pressure air "LPA" from conduit 106G (shown in FIG. 1) mixes with atmospheric air "AA" in the boiler 106A (shown in FIG. 1). The computer controlled solenoid 202 is electronically opened or closed in response to pressure readings from the pressure sensors 110 correlated by the controller 114 as shown in FIG. 1 and as further discussed in connection with FIGS. 3 and 4.

Referring to FIGS. 1 and 2, as atmospheric air "AA" flows through the solenoid valve's 112A/202 internal orifice (not shown), the air expands inside the boiler 106A and boiler line 106F. Water inside the boiler 106A is heated by a heater 106B beneath the boiler 106A, and the water vaporizes. The vaporized water mixes with the expanded air entering from the solenoid valve 112A/202, and the combined humidified air travels through conduit piping 106F to the interior space of the chamber 120. The humidifier assembly 106 provides sufficient heat to saturate the incoming expanded air at the target storage pressure.

The pressure regulator 200 (FIG. 2) working in conjunction with the system 100 (FIG. 1) produces novel pressure control conditions. First, the regulator 200 introduces air to the system 100 much more precisely than prior systems, and permits pressure control within plus or minus 0.2 mm Hg. Prior art systems could achieve, but not maintain, a target pressure within this narrow window. For example, when operating at 0.5 degrees Celsius and 9 mm Hg, a decrease in pressure by 2 mm Hg will decrease the oxygen concentration by 47%. Depending on the commodity, this decrease in oxygen will kill the tissue.

Second, the regulator 200 insures that air is actually added to the chamber space 120. The controller 114 is programmed to monitor the PWM signal to the regulator 200 to ensure that an adequate amount of air is added to the chamber 120 at all times. The PWM signal corresponds to a given air flow rate at a given atmospheric pressure. In prior systems, depending upon the leak rate of the chamber, there was no guarantee how much a regulator would open or even whether it would open at all and allow fresh air to be humidified then added to the system. Leaks in the chamber would cause desiccation at low pressures with no obvious cause as the pressure would be held at a constant level.

Third, the regulator 200 in conjunction with the controller 114 can be used to determine whether the system 100 has leaks while in operation. The actual PWM value is compared against a value for a leak free system. The difference between the PWM value for a leak free chamber and the measured PWM value (air flow rate) through the regulator 200 is the system leak rate, when holding a set pressure. If a leak is detected, a storage operation can be aborted. In prior systems, the leak rate could not be determined while in operation and consequently the target conditions required in this patent could not be achieved.

Fourth, the regulator 200 in conjunction with the controller 114 may be operated to dynamically increase or decrease the pressure within the chamber 120 based on changes to the chamber's 502 environment. This is particularly important when the temperature changes even by a small amount. For example, if operating at 0.5 degrees C. and 9 mm Hg, it is common to have the temperature increase in the center of a load by up to 3 degrees C. Without changing pressure this would result in nearly a 27% reduction in oxygen. Depending on the commodity, this can have a disastrous effect.

Finally, the solenoid pressure regulator 200 is inexpensive (less than half the cost) of prior art regulators and is capable of easy replacement.

Alternately, the valve 202 in the regulator 200 can be replaced by opening and closing a solenoid 202 for short periods of time without harming the stored tissue. Similarly, the location of the regulator 200 can be moved to the down stream side 126 of the system 100 and the same benefits can be achieved. An alternate embodiment of the pressure regulator 200 comprises a non electronically controlled calibrated gas intake orifice through which atmospheric air, oxygen or other gasses, singly or in combination, are introduced to the interior storage volume.

3) Thermal Uniformity

The methods disclosed herein are further dependent on an interior chamber wall temperature kept uniform to within ±0.2° C. Due to both a high diffusion rate (FIG. 7) and elevated convective coefficient of condensation at a hypobaric pressure, if a cold spot develops on chamber wall 102, an evaporation/condensation cycle develops and causes water to continuously evaporate from the commodity, diffuse to and condense on the cold area. This causes the chamber air's dew-point to approach the cold spot's temperature, and results in an excessive commodity water loss. To assure the required wall temperature constancy and uniformity, the chamber is cooled by a jacketed and modulated refrigeration system. Similarly to leak rate, this condensation-based drying affect increases logarithmically as the pressure drops. This is due to increased water vapor diffusion rates (FIG. 7) as the pressure drops. In the ultra low pressure correlated conditions of this application, this desiccating condensation cycle is reduced by maintaining precise chamber wall temperature uniformity.

During CA storage there is a striking similarity between low-$O_2$ damage and chilling injury, and to avoid both disorders, the storage temperature typically is elevated by 3° C. when less than 2% $O_2$ is supplied. This similarity may in-part arise from the fact that alcohol dehydrogenase activity increases several-fold within 4 to 8 hours and reaches a maximum within 20 to 24 hours in response to low-temperature stress or an excessive water loss. ULP storage sometimes alleviates chilling damage as well as low $O_2$ injury when it pervporates ethanol, acetaldehyde and ethyl-acetate from the commodity. After three weeks storage at a 10° C. chilling temperature, 50-70% of Lula and Waldin avocados kept at 760 mm Hg had unacceptable chilling injury and decay, whereas 90-100% of fruits stored at 20 mm Hg (0.3% $O_2$) had not developed either disorder (Spalding, 1979).

Referring to FIG. 1, in the warehouse embodiment 100, the chamber 102 promotes thermal uniformity by being constructed from ⅜ inch thick steel walls. As discussed in connection with FIG. 5, infra, an alternate embodiment comprises a chamber 502 constructed of aluminum. The aluminum walls are insulated with low density foam, covered with thin cladding, and a secondary coolant is pumped through hollow stiffening rings which provide structural strength to the container. The container is maintained at a constant correlated process temperature ±0.2° C. throughout its length even at ambient temperatures as high as 120° C. Because a secondary coolant is used, no refrigeration defrost cycle is required.

The steel (or aluminum) chambers 102 may be placed inside a constant temperature refrigerated space (jacket) provided that the space's refrigeration system is modulated to provide at least +/−0.2° C. accuracy and is not interrupted by defrost cycles.

While the warehouse chamber 102 is constructed from steel with an aluminum door, it should be understood that any suitable or desirable material may be utilized for the chamber 102, door 104, and/or portions thereof, provided the requisite thermal uniformity is maintained, including without limitation, steel, iron, aluminum, other metals, alloys, standard composites, carbon fiber composites, metal matrix composites, carbon matrix composites, and/or concrete.

4) Humidity Control

Referring to FIG. 1, the humidifier assembly 106 comprises an insulated boiler 106A, a heater 106B, and a conduit 106E. The pressure in the boiler 106A is kept close to the pressure inside the chamber 120, and the boiler 106A is automatically kept approximately half filled with water (not shown). A wattage is applied to the heater 106B in the boiler 106A, which is calculated to provide the amount of energy required to boil the amount of water per hour required to saturate the amount of air/water vapor mixture being evacuated each hour by the pump 108A/B. The amount of air/water vapor mixture evacuated each hour by the pump 108A/B corresponds to the air-change rate through the chamber 120.

A target range for air-change rate is typically between 0.3 and 10 chamber volumes per hour. The humidity is sensed and measured both in the conduit 106F downstream of the boiler 106A, and inside the chamber 120, by wet and dry bulb thermistors.

Referring to FIG. 1, in operation, humidified air passes out of the boiler 106A, through the conduit 106F, and into a pipe (not shown) traversing proximate the upper margin of the interior wall of the chamber space 120. The humidified air is uniformly introduced to the chamber 120 via small diameter spaced hole openings along the length of the pipe. Humidified air exits the chamber 120 and enters an exit conduit 126 via a similarly configured pipe (not shown) with spaced hole openings proximate to the lower margin of the opposed internal side of the chamber 120. An air flow system in which air enters from the top margin of the chamber, on the one hand, and air is evacuated from the bottom margin of the chamber, on the other hand, provides for a uniform distribution of the air-change.

The methods disclosed herein operate at near saturation, which for purposes of this application, means greater than 95% relative humidity, as measured by the wet and dry bulb thermistors. The target humidity level may be maintained via feedback from a humidity sensor located external to the storage space, or may be maintained without use of a humidifier.

5) Controller

Referring to FIG. 1, the system 100 comprises a computer controller 114 coupled to a user interface 115, sensors 110 and regulators 112A-C. A plurality of sensors 110 are positioned along the length of the chamber 102. The sensors 110 measure the pressure, internal space 120 temperature, chamber wall temperature, humidity level in the air change before and after it enters the chamber, and air-rate change and electronically transmit the data to the controller 114, as further discussed in connection with FIG. 3.

Other sensors 110 may be utilized to sense and transmit additional data to the controller 114, including data representing: pumping speed, commodity temperature, introduced gas flow, water level in the boiler 106A, water purity, air input, process effluents, process byproducts, and/or door 104 status.

6) System Configuration

Figure 3:
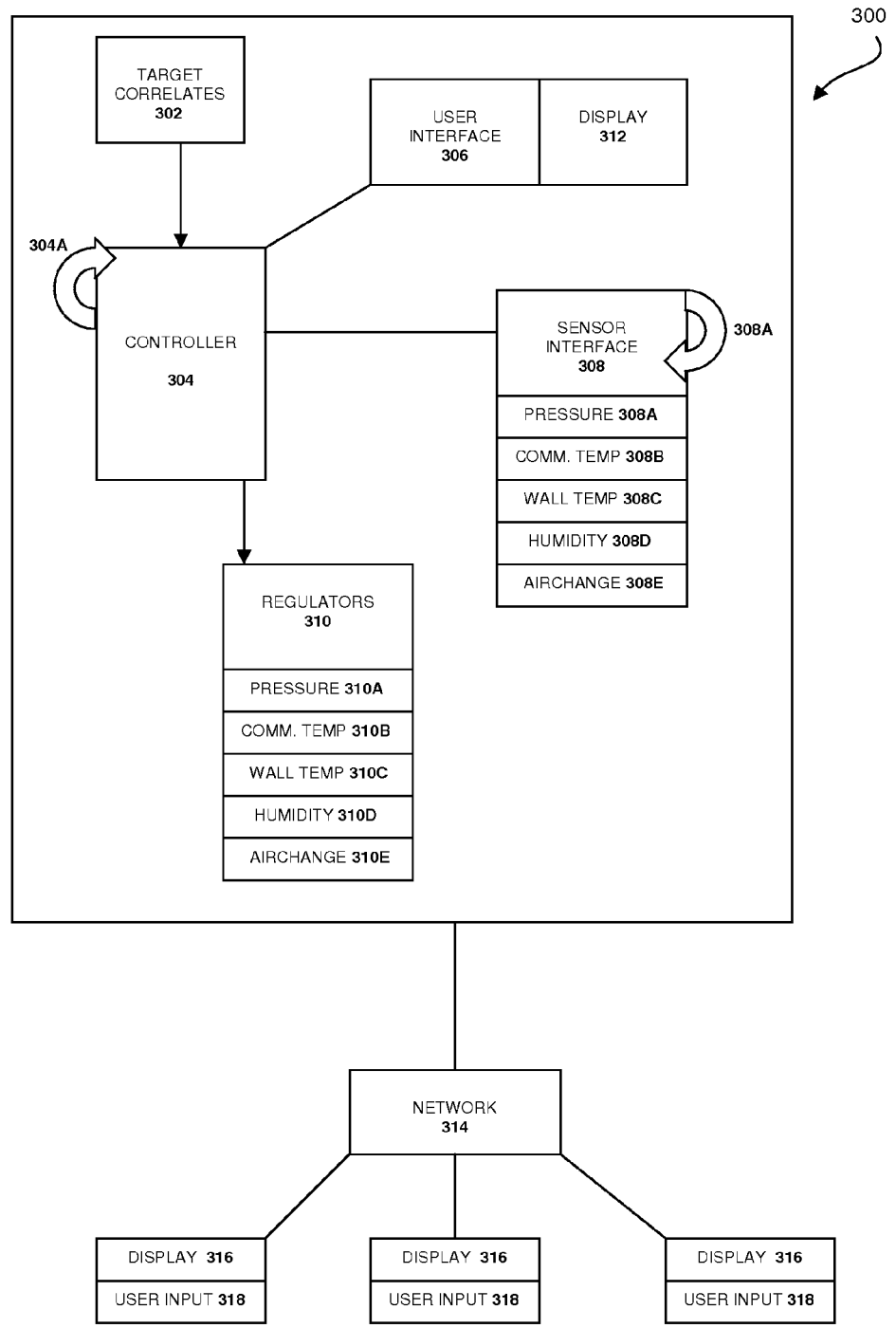
FIG. 3 is a block diagram of an exemplary configuration for the hypobaric chamber system.

FIG. 3 is a block diagram of the configuration 300 for the hypobaric chamber system, according to the invention. Referring to FIG. 3, target correlates 302 are downloaded to a controller (computer) 304. Each correlate 302 is programmed to correlate a predetermined desired attribute (physical characteristic) of the post-storage commodity (tissue), with one or more of the following: pressure data, commodity temperature data, chamber wall temperature data, humidity level data, and air-rate change data. The correlates 302 may further include: pumping speed parameters, commodity temperature parameters, commodity packaging parameters, introduced fumigant parameters, parameters for temporary shifts in the air-change rate, parameters for re-humidifying the tissue, parameters for flavor enhancement, parameters for color enhancement, parameters for stationary storage, parameters for transported storage, and/or parameters for vacuum cooling.

The pre-selected range of ultra-low pressures correlates to the preferred storage temperature for the particular commodity at issue. Table 1 shows the saturated vapor pressures of acetaldehyde, ethyl acetate, ethanol and water at various temperatures. Referring to Table 1, as the storage temperature increases, the vapor pressures rise. Consequently, for a commodity best stored at 13° C. (such as a tropical fruit), the saturated vapor pressure of water at 13° C. is 11.2 mm Hg, and the vapor pressure of acetaldehyde is 570 mm Hg, ethyl acetate is 51.5 mm Hg and ethanol is 28.4 mm Hg. For a commodity best stored at 0° C., the saturated vapor pressure of water is 4.6 mm Hg, and the vapor pressure of acetaldehyde is 330 mm Hg, ethyl acetate is 24.6 mm Hg and ethanol is 11.8 mm Hg

TABLE 1

| Storage temperature | Saturated vapor pressure (mmHg) | | | |
| --- | --- | --- | --- | --- |
| (° C.) | Acetaldehyde | Ethyl-acetate | Ethanol | Water |
| 0 | 330 | 24.6 | 11.8 | 4.6 |
| 1 | 348 | 26.1 | 12.6 | 4.9 |
| 2 | 373 | 27.7 | 13.6 | 5.3 |
| 3 | 384 | 29.3 | 14.6 | 5.6 |
| 4 | 400 | 31.1 | 15.6 | 6.1 |
| 5 | 415 | 33.0 | 16.7 | 6.5 |
| 6 | 431 | 34.9 | 17.9 | 7.0 |
| 7 | 451 | 37.0 | 19.1 | 7.5 |
| 8 | 469 | 39.2 | 20.5 | 8.0 |
| 9 | 488 | 41.4 | 21.9 | 8.6 |
| 10 | 506 | 43.8 | 23.4 | 9.2 |
| 11 | 523 | 46.3 | 25.0 | 9.8 |
| 12 | 538 | 48.9 | 26.6 | 10.5 |
| 13 | 570 | 51.5 | 28.4 | 11.2 |
| 14 | 592 | 54.5 | 30.3 | 12.0 |
| 15 | 616 | 57.4 | 32.2 | 12.8 |
| 16 | 640 | 60.5 | 34.3 | 13.6 |
| 17 | 680 | 62 | 36.5 | 14.5 |
| 18 | 709 | 65.5 | 38 | 15.5 |
| 19 | 732 | 69.5 | 40 | 16.5 |
| 20 | 757 | 73.5 | 43 | 17.5 |

In order to achieve controlled, on-going pervaporation of the harmful substances, at a 0° C. selected storage temperature, the pre-selected range of pressures is the narrow band of ultra-low pressure between approximately 4.6 mm Hg and 11.8 mm Hg at 0° C.; and at a 20° C. selected storage temperature, the pre-selected range of pressures is the narrow band of ultra-low pressure between approximately 17.5 mm Hg and 43 mm Hg.

The pre-selected range of pressure is maintained while the uniform temperature of the chamber wall is constant to within ±0.2° C., the humidity is near saturation (at or above 95% RH) at the uniform temperature, and the air-change rate is between 0.3 and 10 chamber volumes per hour. The tissue is maintained at a temperature that equals or exceeds a minimum temperature which the tissue can tolerate without chilling injury.

Exemplary target correlates 302 FIG. 3 for extended storage of cauliflower are: pressure at 8 mm Hg, a chamber temperature of 0.5° C., a RH of 100% and an air-change rate of 2 volumes per hour.

Referring to FIG. 3, the user identifies one or more desired correlates 302 for the processed cellular tissue via a checklist generated and displayed on a user interface 306. The correlates 302 may be identified by a user's selection, or identified after being recommended to a user based on data input by the user, including type of commodity being loaded into the chamber, in-coming temperature of the commodity, and/or the ripened state of the commodity.

Referring to FIG. 3, after a commodity is placed in the chamber and the chamber is sealed, the sensor interface 308 receives data over time 308A representing the pressure 308A, commodity temperature 308B, chamber wall temperature 308C, humidity 308D and/or air-change rate 308E for the system 300. It should be understood that the system 300 is operable with only a pressure sensor 308A and at least one temperature sensor, such as a chamber wall temperature sensor 308C or commodity temperature sensor 308B, in its most simplified configuration. For example, the humidifier 106 (shown in FIG. 1) may be operated at a set rate independent of any humidity sensors. The sensor interface 308 receives the data approximately once every five seconds; however, any suitable or desired frequency of sensed data 308 for any particular target may be instituted.

The data 308A received via the sensor interface 308 is correlated (compared) over time by the controller 304A to the one or more targets 302. In turn, the regulators 310 are operated by the controller 304 to maintain and/or adjust pressure 310A, commodity temperature 310B, wall temperature 310C, humidity 310D, and/or air-change rate 310E. It should be understood that the system 300 is operable with only a pressure regulator 310A and a humidifier 310D in its most simplified configuration. For example, temperature may be regulated by placing the chamber 102 (shown in FIG. 1) in a room maintained at a constant temperature thereby eliminating the need for temperature regulators coupled to the system 100.

The pressure regulator 310A controls the pressure level to within plus or minus 0.2 mm Hg of the target pressure. The pressure regulator 310A comprises the vacuum pumps 108A/B (shown in FIG. 1), the regulator device 200 shown and described in connection with FIG. 2, and pressure sensors 110 shown in FIG. 1. The pumps 108A/B are manufactured by Busch, Part Number RA0165.D506. The regulator device 200 is a proportional valve manufactured by Clippard Instruments of the EVP Series. The pressure sensors 110 are manufactured by Honeywell, Part Number ASCX 15AN.

Thermocouples and thermistors are used to measure and control temperature. The thermocouples are manufactured by Omega Engineering, Part Number SA1-K. Thermistors (both wet and dry bulb) manufactured by Omega Engineering, Part No. HSTH-44033-40 are used to sense and measure humidity levels.

Referring to FIG. 3, the system 300 may further comprise a graphics generator 312 to prepare and display a presentation of a storage status model over time. The display includes information regarding commodity type, start and stop times, target correlates, check-list completion status, the name of the user that initiated the process, and system identification information. The user may be presented with a startup check-list, including a check-list for packing, wet bulbs (to sense humidity), door seals, temperature probes, venting, and safety checks, prior to initiating storage processing.

The controller 304 may be further programmed to automatically send one or more storage status reports to addresses on a storage distribution list over time, or at specified times during the storage period.

The target correlates 302 provide the required process parameters for a wide range of storage items, including without limitation, harvested metabolically active plant tissue, unharvested plants and tissue, vegetables, floral crops, cut flowers, rooted cuttings, non-rooted cuttings, ripe fruit, non-ripe fruit, breads, dairy products, precooked or uncooked foods, pharmaceutical or herbal products, and potted plants. The system may be further programmed for storing multiple types of commodities and providing process parameters that best serve a particular combination of commodities.

Referring to FIG. 3, the system may further comprise means for remote observation and/or control via a network 314. The network 314 comprises a wireless connection to the display generator 312 via the internet and/or a localized Ethernet connection to a computer, such as a laptop. The network 314 may include onboard communications systems for mobile embodiments, such as portable shipping containers.

In addition, or alternately, the storage status 312 may be monitored via remote displays 316, 320, 324 and controlled via remote user input 318, 322, 326. For example, a remote supervisor may monitor the status of the shipping containers via the internet as the container is being transported to ensure constant storage conditions as disclosed herein. If a user 318, 318, 318 desires to modify the target correlates 302 during the storage period, the user 318, 318, 318 may edit the user input to select one or more new target correlates 302, which are communicated to the controller 304.

C. Methods to Create and Maintain Controlled Pervaporation

1) Extended Storage

Figure 4:
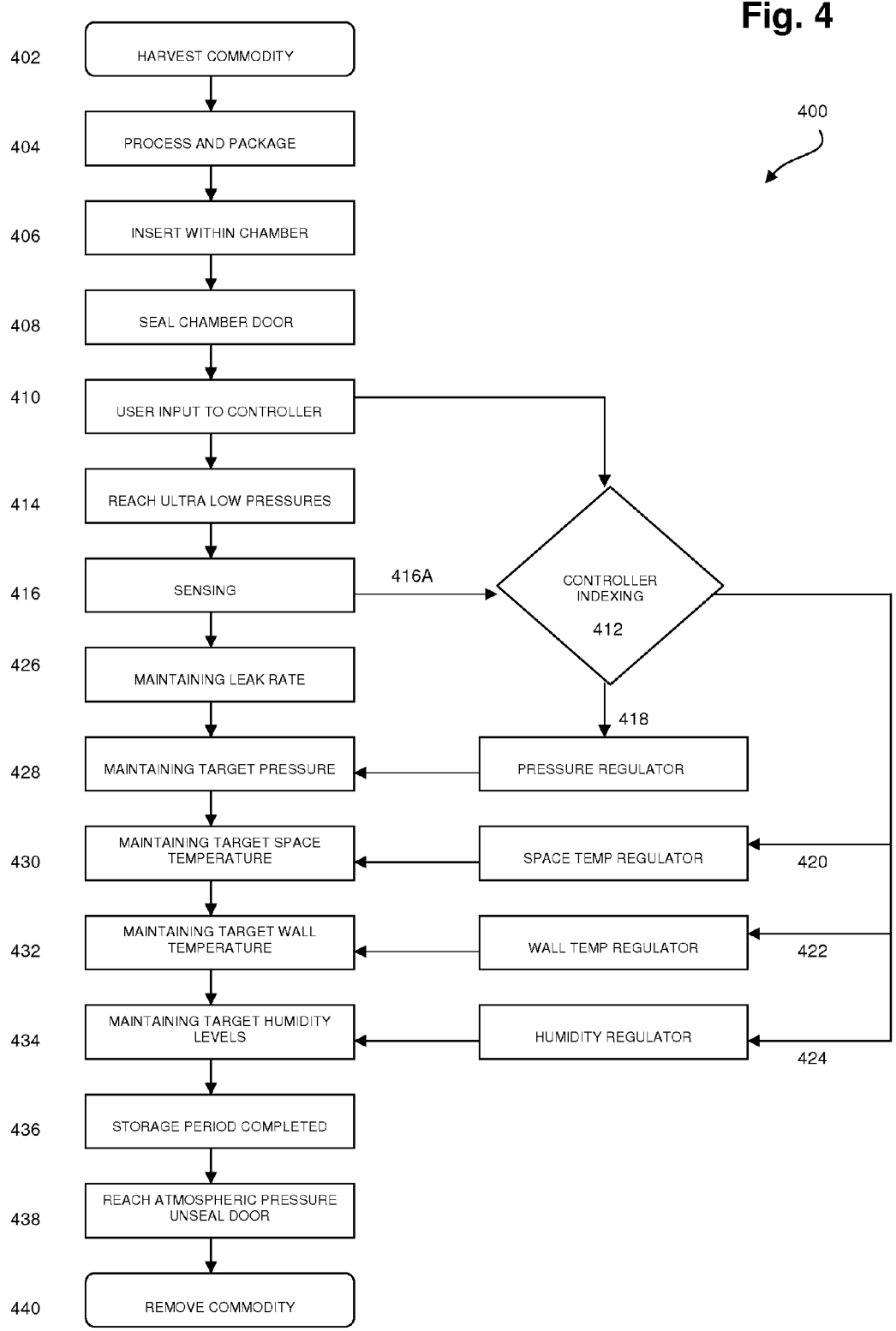
FIG. 4 is a flow diagram of an exemplary method of utilizing the hypobaric chamber system for storage of a commodity.

FIG. 4 is a flow chart of an exemplary method for extended storage processing 400, according to the invention. In step 402, the commodity is harvested. In step 404, the commodity is processed, including cooling to the target storage temperature, washing, and if necessary, treatment with chlorine and/or application of other fungicides or bactericides, and packaged for storage.

In step 406, the commodity is transported to a warehouse in which a chamber is located, and the commodity is off-loaded and placed inside the chamber. In step 408, the chamber is sealed.

In step 410, a user, via a user interface, identifies for the controller one or more target correlates. In step 412, the controller indexes storage to identify a target pressure for the target correlates. In step 414, in association with activation of the pump, the target pressure is communicated to the pressure regulator, and the target pressure is reached within the chamber.

In step 416, sensors receive data over time 416A representing the pressure, commodity temperature, chamber wall temperature, humidity level, and/or air-change rate. In step 412, the sensor data 416A is correlated (compared) over time by the controller to the target input 410.

In step 418, the pressure regulator is operated by the controller 412 to maintain and/or adjust pressure 428 to maintain the target pressure inside the interior storage space. In step 420, the commodity temperature regulator is operated by the controller 412 to maintain the targeted air temperature 430 inside the storage space. In step 422, the wall temperature regulator is operated by the controller 412 to maintain the targeted wall temperature 432 inside the storage space to within ±0.2 degrees C. In step 424, the humidifier system is operated to maintain a level of humidity inside the interior storage space at or above 95% relative humidity.

In step 426, due to the construction of the chamber, a chamber leak rate of less than 4.0 mm Hg is maintained at all times.

In step 436, the commodity is stored for a period of time. In step 438, the pressure within the chamber is equalized, and the door is unsealed. In step 440, the commodity is removed from the chamber.

The method 400 prevents low-oxygen damage to the commodity by constantly and consistently removing the fermentation end-products ethanol, acetaldehyde, and ethyl acetate, produced in response to the low-oxygen conditions. The high solubility of ethanol, acetaldehyde and ethyl acetate in oil and their small molecular size cause them to rapidly diffuse through the tissues' plasma membrane across a small concentration gradient, whereas water vapor movement by this route is limited due to a 99.4-99.5% relative humidity in the intercellular spaces. These fermentation end-products vaporize by pervaporation during passage through the plasmalemma's outer hydrophobic surface and are eventually removed from the chamber via evacuation, diffusion and forced flow.

2) Added Benefit: Invertebrate Extermination

The novel system and method of controlled pervaporation of the present application serves additional functions for the food storage and preservation industry. One such added benefit may be the extermination of certain types of invertebrates (insects) inside the chamber while the commodity is in storage, without requiring the introduction of pesticides or other gasses. The commodity, once removed from the chamber after the storage period of extended controlled pervaporation, may exhibits an absence of live invertebrates at any life stage.

The U.S. and other countries prohibit importation of horticultural commodities that have not been treated by an approved method ensuring Probit 9 (99.99%) mortality of quarantine pests. Because the widely used methyl bromide fumigation is being phased out due to environmental concerns, and other quarantine treatments degrade the quality of imported fruits and vegetables, a new approach is needed.

It is widely known that desiccation is one of the most effective ways to kill insects. An insect's spiracles normally are kept closed to minimize water loss, and open just enough to take in needed oxygen. When oxygen is scarce, such as in a high vacuum environment, insects open their spiracles more frequently and wider, leading to as much as a seven to ten-fold greater rate of water loss and subsequent death. Most insects die when their total body-water loss approaches 30%. As water vapor's diffusion coefficient in helium is 3.33 times higher than in air, helium takes only half as long as nitrogen to cause mortality of insects. A 10 mm Hg pressure has a much greater potential than helium to desiccate insects because it increases the rate at which water vapor diffuses through an insect's spiracles and trachea by nearly 100-fold (FIG. 7). The surface/volume ratio (S/V) of a commodity or insect compares the surface area through which evaporation may occur vs. the total volume of body water. For a spherical object S/V=3/r where r is the radius. The S/V ratio of a 0.1 mm diameter spherical insect egg is 750-fold larger than that of a spherical 75 mm diameter fruit. Therefore the egg tends to desiccate that much faster than the fruit.

While the effects of low vacuum on insects are well known, to date, these same conditions often damage the commodity under storage. For example, some methods of insect eradication comprise a series of cycles of rapid pump-down to pressures in the 70 mm Hg range followed by admitting compressed fumigant gases to bring the pressure back up. The rapid ventings crush and distort soft commodities such as strawberries, raspberries, and grapefruits, and this insecticidal technique often fails to kill off all insect eggs and larvae present in the commodity.

Contrary to the above findings, utilization of the novel system herein to create and maintain an extended period of ultra-low pressures within a very narrow range that never exceeds the boiling point of the intracellular water molecules encompasses a pressure and temperature range that many studies claim effectively kills certain types of invertebrates at all stages. The harmful substances that build pervaporate away from the commodity whereas the invertebrates are unable to survive the prolonged ultra-low pressure conditions. However, this treatment clearly is not effective with all types of insects. An exposure time in excess of 2 weeks at 13° C., 99% RH, and 15 to 20 mm Hg, and even lower pressures, did not kill eggs and larvae of the Caribbean fruit fly (Anastrepha suspensa Loew) present inside fruits or on the surface of damp filter paper (Davenport and Burg, 2009).

Referring to FIG. 4, at step 434, the method of invertebrate extermination may further comprise the step of temporarily shifting (lowering) the initial air-change rate to a lower air-change rate to produce sufficient ethanol and acetaldehyde from within the commodity tissue to kill insects. The method 400 may further comprise computer-implemented reports during steps 428-434 and/or certification at the conclusion of step 436 via a user interface. The reports may indicate whether the method of invertebrate extermination has been carried out for a given storage load, without disruption, to the satisfaction of an inspector or regulatory agency. While this methodology is successful with some types of insects, it failed to kill eggs and larvae of the Caribbean fruit fly present inside fruits or on the surface of damp filter paper (Davenport and Burg, 2009). The natural habitat of the Caribbean fruit fly includes fermenting fruits which often contain high concentrations of ethanol. Such flies have inbred and produced strains that are resistant to ethanol's toxic effects. This may occur with other insect types.

3) Alternate Method: Fumigation Introduction, Removal and Reduced Dosage a) Fumigation Techniques The novel system and method of controlled pervaporation of the present application may alternately be used in conjunction with fumigation techniques. A major cause of post harvest decay is infections which originate in cuts or superficial damage caused by post harvest handling. Therefore, plant commodities often are treated post harvest with a chlorine wash and/or other fungicides and bactericides before being placed into conventional cold storage or controlled atmosphere conditions.

Referring to FIG. 4, as an alternate method of this application, in lieu of post-harvest fumigations (during step 404), after the commodity is sealed within the chamber at step 408, but before undergoing sustained controlled pervaporation (steps 428-436), one or more volatile bactericides and/or fungicides are introduced to the chamber to deter mold and bacterial growth and associated decay of the commodity. Combining a step of fumigation with storage: 1) reduces post harvest handling and associated damage to the commodity; 2) saves time in getting the commodity into storage thereby decreasing the opportunity for decay prior to storage; and, 3) avoids the high cost associated with separate fumigation.

Any fumigant/fungicide/bactericide substance with a vapor pressure higher than water may be introduced to the chamber, including, without limitation, ethyl formate and ethyl acetate. To do so, a measured amount of the liquid fumigant is placed in a small vacuum rated container. The amount of fumigant correlates to the size of the internal space of the storage chamber and the desired effect for the fumigant in relation to the type and amount of commodity stored within the chamber. The fumigant container is connected by a conduit to a closed storage chamber valve. After the storage chamber is pumped down to an ultra-low pressure at the desired storage temperature, the valve is opened, causing the fumigant to vaporize and enter the chamber. To prevent the evaporative cooling caused by fumigant vaporization from lowering the temperature and interfering with the release of additional fumigant vapor from the fumigant container, said fumigant container can be wrapped in a temperature controlled mantle to maintain it at the same temperature as the storage chamber.

This alternate method may be utilized to fumigate against fungi and bacteria that affect plant species. The fumigant may be any desired or suitable substance, such as naturally occurring substances (e.g., ethyl formate and ethyl acetate). Where natural fumigants are employed, the method can be used to maintain a certified "organic" status for a commodity.

b) Anti-Fumigation (Anti-Toxin/Anti-Contaminant) Benefit

Referring to FIG. 4, the novel system and method 400 of controlled pervaporation of the present application provides the added benefit of removing fumigants/fungicides and other toxins other contaminates from commodities while in storage. Referring to step 402 of FIG. 4, certain plant commodities are exposed to volatile liquid fumigants prior to or immediately after harvest. While these commodities are typically washed (step 404) prior to placement inside the chamber, fumigation chemicals, toxins and/or contaminants remain The novel system and method 400 provide a steady state of pervaporation (steps 428-436) that cause the added fumigation molecules to vaporize and be removed from the commodity, thereby ridding the commodity of potentially harmful chemicals as it is being stored.

4) Alternate Method: Continuous Application of Hypochlorous Acid Vapor

A concentration of available chlorine capable of preventing microbial growth can be continuously produced and passed over the commodity during hypobaric storage by adding alkaline sodium hypochlorite to the water used to humidify the storage chamber. Air chlorinated in this manner is remarkably efficacious at a sub-atmospheric pressure in preventing the growth of a wide variety of molds and bacteria. The active ingredient is hypochlorous acid vapor, and the rate at which it is evolved depends on its concentration in the solution, which is determined by the concentration added, the solution's pH, and its cation concentration. Hypochlorite solutions ranging in concentration from 0.1 to 2.6% (weight/volume) equilibrate with atmospheric $CO_2$ at pH values in the range 8.5 to 9, but because the $CO_2$ concentration is decreased in a hypobaric air-change, the solution's equilibrium pH is higher and the rate of generation of hypochlorous acid vapor lower.

By adjusting the hypochlorite and cation concentrations present in the solution, and the amount of bicarbonate/carbonate buffer relative to the $CO_2$ concentration in the air change at the storage pressure, a stable and effective concentration of hypochlorous acid vapor which does not harm the commodity can be continuously generated at the preferred storage pressure and temperature. As rapidly as hypochlorous acid is lost from the solution it is regenerated from the large excess of hypochlorite ion present, causing the solution's alkalinity to increase very little regardless of the air-change rate. The only residue left in the tissue is HCl, which is harmless.

5) Alternate Method: Forced Rehydration, Color Enhancement and/or Vacuum Infiltration of Plant Hormones and Nutrients Referring to FIG. 4, at step 406 cut flowers or cuttings which have become dehydrated can be rehydrated by immersing their cut ends under water or into a preservative solution contained in a small pail, placing the pail within the storage chamber (step 406), sealing the chamber door (step 408), pumping the chamber down to an ultra-low pressure (step 414), and then venting the chamber as rapidly as possible (step 438). The venting occurs more rapidly than incoming air can be forced into and through the commodity's intercellular system, thereby creating a differential pressure forcing the liquid contained in the pails to refill the occluded xylem vessels. Cut flowers and cuttings are not injured by extremely rapid venting.

Cut-flowers sometimes are dyed prior to sale, for example green carnations for St. Patrick's day. These may be dyed in a hypobaric enclosure by the same method used for rehydration, adding a coloring dye, in this instance green, to the water.

Other substances can be vacuum infiltrated into cut-flowers, cuttings and produce by this method, including 1-amino cyclopentane carboxyl acid (ACC) and plant hormones such cytokinins, auxins, and giberrellins, which sometimes beneficially regulate flower fading, senescence, de-greening, and abscission of leaves, and nutrients such as calcium which sometimes have beneficial effects on storage and shelf-life. Vacuum infiltration also may be used to introduce shelf life extension processing agents, including without limitation, 1MCP or TDZ 6) Alternate Benefit: Flavor and/or Color Enhancement Referring to FIG. 4, at step 424, the novel system and method of this application also may be utilized to achieve a benefit of flavor enhancements and/or color enhancements, thereby maximizing the aesthetic qualities of the post-storage commodity at step 440. Most fruit is harvested at a less mature state so as to not ripen and spoil during transport and distribution at atmospheric pressure. Fully mature fruit develops much better flavor and color when it ripens as compared to less mature fruit.

The method 400 may be utilized to store more mature fruit that will result in fruit that has superior taste and color after removal 440 and subsequent ripening. Fruit is harvested 402 at a time when it has achieved a more mature state, then stored 400 as a mature fruit. The mature fruit, following removal 440, exhibits enhanced flavor and/or color after it is subsequently ripened. In addition, flavor additives (such as sugar) or other flavors may be vacuum infiltrated into, or vacuum deposited onto, a commodity in storage.

7) Alternate Method: Ozone Treatment

Ozone applied at a low enough concentration is non injurious to many types of horticultural commodities and highly effective as a fungicide and bactericide. It is not possible to continuously generate the desired concentration of ozone by corona discharge, ultra violet light, or any other method, without simultaneously and continuously introducing a high enough concentration of air or oxygen to significantly raise the storage pressure above the target pressure required for pervaporation. Because ozone exerts its antimicrobial effect very quickly, usually within less than an hour, it can be generated only once or intermittently into the storage chamber along with the associated air or oxygen, and then the pressure regulation system will slowly return the pressure to the proper value. The half-life of gaseous ozone at a physiological temperature is 4 days, but it is only 20-30 minutes for ozone dissolved in a horticultural commodity's water. Consequently, an alternate method comprises the step of adding at least one dose of ozone to the chamber or intermittently introducing ozone to the chamber.

8) Alternate Method: Vacuum Cooling Prior To Pervaporation

More than a day is required to vacuum cool a full load of carnations or roses in a hypobaric intermodal container due to the small capacity of the container's vacuum pump and refrigeration compressor. Normally vacuum cooling is intentionally avoided and never attempted during hypobaric storage in an intermodal container because it has been found that commodities such as cut roses and carnations are irretrievably damaged by the process within 3-5 hours, long before they reach a desired storage temperature. However, referring to FIG. 4, the novel system and methods of this application may be modified to also perform vacuum cooling of the commodity after it is placed inside a hypobaric intermodal vacuum chamber (step 406).

To vacuum cool the commodity within a short enough time to avoid damaging it, after sealing at step 408, a powerful ancillary refrigeration system and vacuum pump are temporarily used to speed the cooling process to between 30 and 90 minutes, depending on the type and starting temperature of the commodity. During vacuum cooling, the temperature of the commodity drops in correlation to rapidly reduced pressure in the chamber. In the case of an intermodal container's interior may be modified with a 4 to 6 square inch cross sectional rectangular conductive pipe attached longitudinally to the inner surface of the storage chamber to act as a heat exchanger. The pipe transports cold glycol supplied as a secondary coolant from an ancillary large capacity refrigeration system.

9) Combined Methods

Utilizing the novel system of this application, various methods disclosed herein may be combined to achieve desired results. For example, the commodities placed in the system for storage may be subject to the following methods: 1) vacuum cooling within the chamber to lower the temperature of the commodity; 2) introducing a fumigant to the chamber with the intent to exterminate a particular invertebrate under quarantine or act as a fungicide or insecticide; 3) thereafter further reducing the internal pressure of the chamber to reach and maintain controlled pervaporation; and, 4) transporting the chamber while maintaining controlled pervaporation to not only preserve the commodity, but also to pervaporate the volatile insecticide, fungicide or bactericide from the stored commodity. After a period of storage, due to the prolonged pervaporation period, the commodity is removed in a preserved state with little or no fumigant residue.

By utilizing the novel hypobaric system of this application in combination with one or more of the above-disclosed methods, stored commodities are removed from the chamber at the conclusion of a storage period in a preserved state exhibiting one or more additional features, including without limitation: 1) an absence of live invertebrates; 2) a minimal level of fumigant chemicals; 3) flavor enhancement; and/or 4) color enhancement; 5) cooled.

D. Alternate Embodiment: Shipping Container/Intermodal Container

Figure 5:
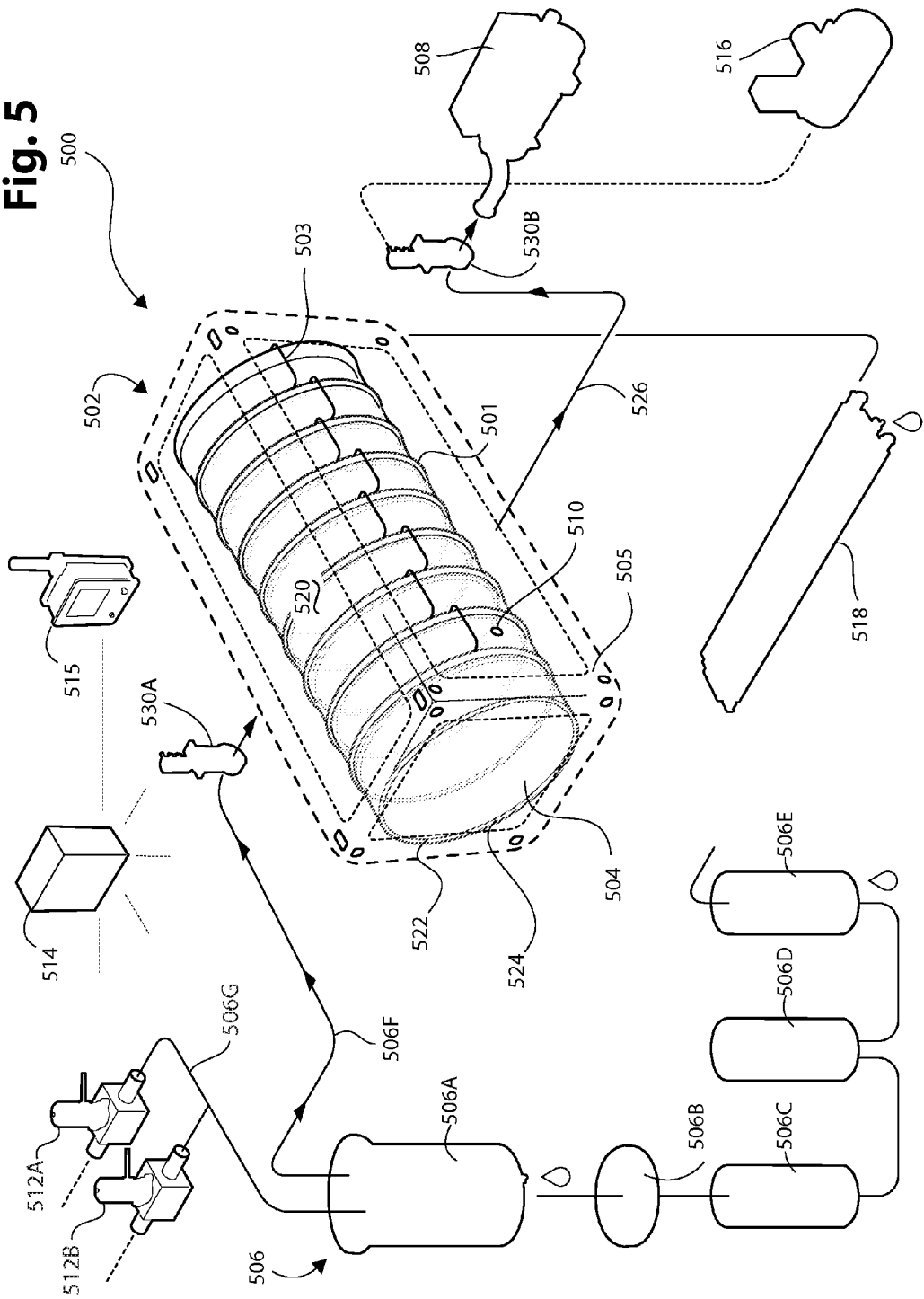
FIG. 5 is a perspective view diagram of an exemplary intermodal hypobaric chamber system.

FIG. 5 shows a schematic drawing of a shipping container embodiment for a hypobaric system of the present invention 500. The shipping container embodiment 500 (also referred to as an "intermodal container") is designed for transport on trucks, ships and railroad cars. The intermodal container's storage chamber 502 is tubular shaped and constructed from aluminum. The chamber 502 is cooled by liquid refrigerated glycol pumped with a centrifugal pump (not shown) in series through circular structural stiffening rings 501 welded to the external wall of the chamber. The stiffening rings 501, coupled to the chamber, are hollow and are interconnected with laterally traversing pipes 503. The container is cooled by an amount of liquid refrigerated substance, such as glycol, flowing through the spaces formed by the rings 501. The container's rear dish-head bulkhead (not shown) is modified to serve as a glycol expansion tank.

Also external to the chamber 502 is a humidifier assembly 506, vacuum pump 508, sensors 510, pressure regulators 512A and 512B, a controller 514, a user interface 515, a compressor 516, and a sump tank 518. The chamber 502 and door 504, when closed as shown in FIG. 5, define an interior space 520 having a volume.

Referring to FIG. 5, the humidifier assembly 506 comprises a boiler 506A, a heater, 506B, a holding tank 506C, a water processor 506D, a water source 506E, and a conduit 506F coupling the boiler 506A and pressure regulator 512A and 512B to the chamber 502. Water enters the assembly 506 from stored water source 506E. The water is purified via reverse osmosis and further undergoes water softening 506D before being further stored in a holding tank 506C. The water is then vaporized via a heater 506B coupled to the boiler 506A prior to entry into the chamber 502 via a pipe conduit 506F.

Novel hypobaric chamber system components are required to create and maintain controlled pervaporation in the intermodal container system 500. Said components and systems comprise: 1) a chamber 502 having a minute leak rate no greater than 4.0 mm Hg per hour; 2) pressure regulators 512A and 512B capable of maintaining the pressure within a specified ultra-low range; 3) means for maintaining thermal uniformity of the chamber space 520 and chamber walls within specified temperatures; 4) means for maintaining humidity inside the chamber 520 at near saturation; and, 5) a computer controller 514 coupled to the user interface 515, sensors 510 and regulators 512A-B.

Referring to FIG. 5, for the intermodal container embodiment 500, the target humidity level alternately may be maintained without use of a humidity sensor, ancillary water, or a humidifier. The vacuum pump 508 and pressure regulator 512A/B may be controlled by adjusting the air entering the container 520 responsive to the level of water evaporating from the commodity due to heat produced by glycolysis and aerobic respiration. In this alternate method for humidification, responsive to the pressure differential between the atmospheric air pressure level, on the one hand, and the target pressure within the storage space, on the other hand, a pneumatic air horn uses 1.0 to 3.6 incoming chamber volumes of air per hour to recirculate 500 to 1800 cfm of chamber air previously saturated by water evaporated from commodity within the storage space responsive to latent heat produced by the commodity's aerobic respiration and fermentation.

Referring to FIG. 5, the aluminum dish head door 504 has a neoprene sealing gasket snapped onto door flange 524. During container pump-down, the door-seal gasket's perforated sealing bulb makes an initial contact with the door sill and vents as it compresses. The self-aligning door, suspended with three degrees of freedom, is drawn inward as the vacuum increases, until the door extrusion's solid O-ring seal 522 makes a final leak-tight closure with the triangular door sill used to circulate cold glycol. After the operational pressure is reached, racking is prevented because the door is held in place by approximately 80,000 lbs. of external force.

Crescent-shaped floor supports (not shown) welded to the aluminum shell at the centerline of each stiffening ring 501 add necessary strength at the point of maximum stress on the chamber 502.

A rectangular suction duct (not shown) mounted along the longitudinal centerline has a series of openings in its underside at the midpoint between each pair of floor supports (not shown). This arrangement creates an even distribution of intake along its length.

An intermodal shipping container (mobile hypobaric chamber), such as the example shown in FIG. 5, may be utilized in conjunction with the methods disclosed herein, including a method comprising the operation of introducing a fumigant to the storage space, and a method comprising the operation of vacuum cooling the tissue.

E. Optional Alternate Feature: Specialized Packing Boxes

Referring to step 404 FIG. 4, the systems and methods of this application may comprise the use of specialized packing boxes designed to minimize weight loss (water loss) from a commodity during hypobaric storage. Perishable commodities usually are shipped or stored in cardboard boxes. Throughout one week a laboratory hypobaric apparatus operating at 15 mm Hg and 13.2° C. could not elevate the RH above 80% when the chamber was filled with non-waxed cardboard cartons. The humidity increased to 99.5% within the vacuum chamber soon after the boxes were removed and the system re-evacuated. The cardboard boxes had been reducing the humidity.

Surface tension causes the saturation vapor pressure over the concave liquid surfaces in the interstices between a cardboard box's hydrophilic cellulose microfibrils to be higher than the saturation vapor pressure over a large plane surface, in accord with the Kelvin equation. The radius of the cardboard interstices is so small that vapor readily condenses in their entrance at a higher temperature than that needed to change the state of water above a plane surface. The rate of water-vapor diffusion from a vacuum chamber's atmosphere to cardboard storage boxes is enhanced more than 76-fold at 10 mm Hg (FIG. 7), and the convective coefficient for film condensation in the spaces within the cardboard box's hydrophilic cellulose microfibrils is much larger at a low storage pressure than it is at atmospheric pressure because in a hypobaric atmosphere it is much easier for the incoming vapor to diffuse through the stagnant air layer adjacent to the box surfaces where water is condensing. Consequently, a rapid transfer of moisture from the humidified chamber air into the cardboard occurs, the water vapor condenses in the box's cellulose capillaries even when the temperature there is the same or somewhat higher than the vacuum chamber's air dew-point temperature, and the box becomes structurally weakened. At atmospheric pressure the rate at which water vapor diffuses from the chamber atmosphere into cardboard boxes, and the condensation film coefficient in the cardboard, is much lower, so the cardboard boxes draw-down the chamber humidity to a lesser extent. The cardboard wicking effect can be prevented or avoided by using returnable plastic boxes or cardboard cartons coated with wax or some other moisture resistant substance. The boxes also may be coated with an FDA approved 'paint' containing minute glass or aluminum fibers or a pigment capable of shielding the commodity from radiation emitted from the chamber's walls. These coatings provide 80-90% effective radiation shielding. Exterior boxes should, in particular, be coated due to their line-of-sight radiant view of the chamber walls. Polyethylene slip sheets with or without perforations may be installed as box liners to restrict water vapor transfer, thereby slightly elevating the humidity and temperature within the box. This prevents the transfer of environmental energy to the commodity, thereby limiting commodity water loss to the amount that can be evaporated by latent heat derived from the commodity's respiration and fermentation.

F. Storage Examples

Figure 6:
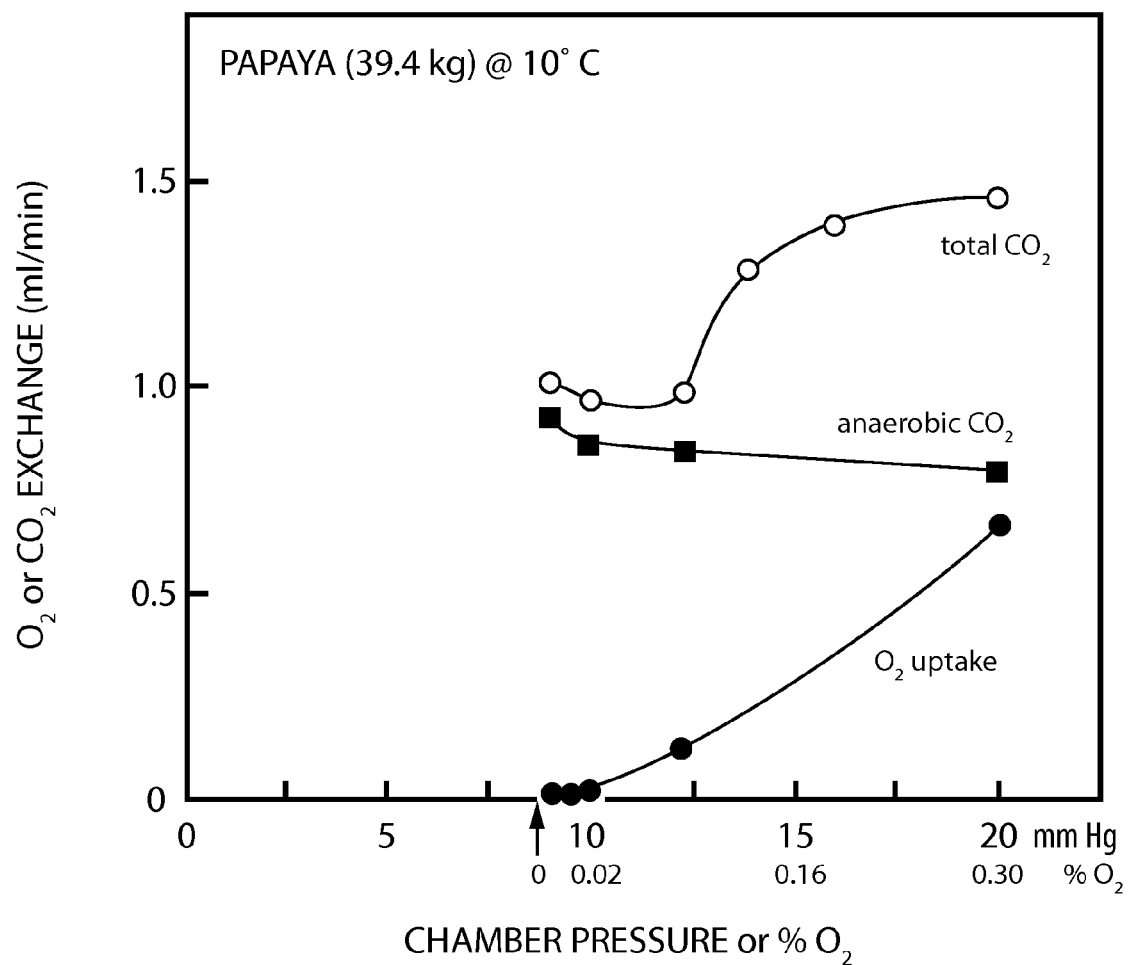
FIG. 6 is a graph plotting the carbon dioxide production and oxygen consumption of papaya fruits stored at various hypobaric and, FIG. 7 is a graph plotting of the effect of pressure on the diffusion coefficient of gases and vapors during low pressure storage.

FIG. 6 is a graph plotting the carbon dioxide production and oxygen consumption of papaya fruits stored at various hypobaric pressures in the novel system of this application. Papayas stored in less than 2% oxygen at 10° C. and atmospheric pressure suffer low oxygen damage, evidenced by a failure to ripen properly and off-flavor development. Referring to FIG. 6, papayas stored in the inventive system utilizing the inventive methods herein, ripen normally with excellent flavor, color and aroma after three to four weeks in storage at 15-20 mm Hg (0.1 to 0.4% oxygen) at 10° C. The papayas do not suffer low oxygen damage at 14 mm Hg (0.08% oxygen) but do at 10 mm Hg (0.02% oxygen).

Another example relates to the storage of mangoes. Mangos can be kept in NA for 2 to 3 weeks at 13° C. The optimal CA condition, 3 to 5% $[O_2]$+5 to 10% $[CO_2]$ at 10 to 15° C., is unsatisfactory because after 2 weeks at 12° C. the fruit has no subsequent shelf-life. $CO_2$ production by mangos is stimulated and ethanol production elevated in atmospheres containing less than 9.2% $O_2$, below 2 to 5% $O_2$ mangos suffer low oxygen damage causing skin discoloration, off-flavors, grayish flesh color, and ripening and chlorophyll degradation are prevented. Less than 1% $O_2$ invariably results in off-flavors, and within 2-3 weeks 2 to 3% $[O_2]$ produced off-flavors in Haden and Tommy Atkins mangoes. Fully mature mangoes were stored at 13° C., with a control set kept at atmospheric pressure and 99.5% RH (controls), and an experimental set stored in an inventive chamber of this application at 15 mm Hg (0.1% $O_2$) and 99.5% RH. The atmospheric pressure control fruits ripened and were dissolved by decay within 9 days. In contrast, fruits kept at 15 mm Hg stored for 60 days in the system of this application upon removal showed no softening, ripening, mold growth, significant water loss or obvious loss of quality. After transfer to atmospheric pressure these fruits ripened at the rate typical of freshly harvested fully-mature fruits, and exhibited excellent flavor, aroma and color.

INDUSTRIAL APPLICABILITY

It is clear that the inventive Systems and Methods for Controlled Pervaporation in Horticultural Cellular Tissue of this application have wide applicability to the fresh food, floral, food distribution, home fresh food preservation, horticultural and medical industries, namely to providing a system and associated methods to preserve fresh living matter while removing toxins. The methods herein prevent the growth of aerobic bacteria and most fungi, and preserve fresh food products with little or no loss in shelf-life or vase-life.

It should be understood that various modifications within the scope of this invention can be made by one of ordinary skill in the art without departing from the spirit thereof and without undue experimentation. For example, the ranges set forth in this application are exemplary, and may be adjusted as needed or desired for particular desired outcomes; the systems and methods disclosed herein may be utilized in the domestic, retail and wholesale industries in chambers of varying shapes, designs and footprints. The systems may be used for a single purpose (such as insect eradication), or for dual/multiple purposes. Single or multiple types of commodities may be stored within the systems. This invention is therefore to be defined as broadly as the prior art will permit, and in view of the specification if need be, including a full range of current and future equivalents thereof.

We claim:

1. An apparatus for processing stored cellular tissue, comprising:
    a processing chamber with a sealed opening, said chamber comprising an external wall and an internal wall defining, along with the sealed opening, an interior storage space having a volume, the chamber constructed to provide a leak rate from said volume of less than 4.0 mm Hg per hour;
    sensors coupled to the chamber to measure pressure in the interior storage space;
    a pressure regulator to regulate pressure within the interior storage space;
    storage containing a target pressure residing between a boiling point of water and a boiling point of one or more toxins at a target temperature;
    a user interface; and
    a controller coupled to the user interface, storage, sensors and the pressure regulator, the controller programmed to perform operations comprising:
        via the user interface, receiving user input identifying one or more desired attributes for the processed cellular tissue;
        indexing the storage to identify one or more target correlates for the desired attributes, said correlates comprising the target pressure;
        according to feedback from the pressure sensor, directing the pressure regulator to maintain the target pressure inside the interior storage space.

2. The apparatus of claim 1, further comprising a temperature sensor and a temperature regulator, wherein the controller is programmed to perform operations further comprising: according to feedback from the temperature sensor, directing the temperature regulator to maintain the target temperature in the interior storage space.

3. The apparatus of claim 1, wherein the target pressure resides between 4.6 and 43 mm Hg for each of the one or more toxins at the target temperature, said target temperature residing between 0 and 20 degrees Celsius.

4. The apparatus of claim 1, wherein the indexing further comprises identifying the target correlates that will not cause a boiling point of an intracellular water molecule within the tissue to be reached.

5. The apparatus of claim 1, wherein the target temperature comprises a thermal uniformity of the internal wall within plus or minus 0.2 degrees Celsius.

6. The apparatus of claim 1, wherein the target correlates comprise a target humidity level at or above 95 percent relative humidity.

7. The apparatus of claim 1, wherein the sealed opening comprises a self supporting O-ring assembly.

8. The apparatus of claim 1, wherein the pressure regulator comprises an electronically controlled solenoid valve.

9. The apparatus of claim 1, wherein the pressure regulator controls the pressure level to within plus or minus 0.2 mm Hg of the target pressure.

* * * * *